United States Patent
Sakurai et al.

(10) Patent No.: US 8,413,133 B2
(45) Date of Patent: Apr. 2, 2013

(54) SOFTWARE UPDATE MANAGEMENT APPARATUS AND SOFTWARE UPDATE MANAGEMENT METHOD

(75) Inventors: Hideki Sakurai, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1117 days.

(21) Appl. No.: 12/352,383

(22) Filed: Jan. 12, 2009

(65) Prior Publication Data

US 2009/0241100 A1  Sep. 24, 2009

(30) Foreign Application Priority Data

Mar. 24, 2008 (JP) ................. 2008-076671

(51) Int. Cl.
*G06F 9/44* (2006.01)
(52) U.S. Cl. .......... 717/171; 717/174
(58) Field of Classification Search .......... 717/170
See application file for complete search history.

(56) References Cited

U.S. PATENT DOCUMENTS

| | | | |
|---|---|---|---|
| 6,675,381 B1 | 1/2004 | Yamaguchi | |
| 2006/0015861 A1* | 1/2006 | Takata et al. | 717/168 |
| 2006/0095566 A1* | 5/2006 | Kanai | 709/224 |

FOREIGN PATENT DOCUMENTS

| | | |
|---|---|---|
| JP | 2001-202248 | 7/2001 |
| JP | A 2005-301594 | 10/2005 |
| JP | 2006-31312 | 2/2006 |
| WO | WO2005088452 | * 9/2005 |

OTHER PUBLICATIONS

Kallahalla, "SoftUDC: A Software-Based Data Center for Utility Computing", 2004, IEEE, p. 38-46.*
Kobayashi, "A High-Availability Software Update Method for Distributed Storage Systems", 2006, Wiley, p. 35-46.*

* cited by examiner

*Primary Examiner* — Li B Zhen
*Assistant Examiner* — Duy Khuong Nguyen
(74) *Attorney, Agent, or Firm* — Greer, Burns & Crain Ltd.

(57) ABSTRACT

A software update management apparatus includes a migration pattern table generation unit for reading a pre-migration environment table and a post-migration environment table and judging a migration content between before and after the update, for each function of a target disk node, and for reading a migration pattern determination table and determining a migration pattern to be applied to the target disk node based on the migration content and the migration pattern determination table. The software update management apparatus also has an update unit for reading the post-migration environment table, issuing an instruction to the target disk node according to the migration pattern determined by the migration pattern table generation unit, and updating software which executes each function of the target disk node.

13 Claims, 24 Drawing Sheets

FIG. 6

114 SLICE MANAGEMENT INFORMATION

114a SLICE MANAGEMENT INFORMATION MEMORY UNIT

| DISK NODE ID | SLICE ID | FLAG | LOGICAL_VOLUME ID | SEGMENT ID | PAIRED DISK NODE ID | PAIRED SLICE ID |
|---|---|---|---|---|---|---|
| SN-A | 2 | P | LOVL 1 | 1 | SN-B | 2 |
| SN-A | 4 | P | LOVL 1 | 4 | SN-C | 1 |
| SN-A | 5 | S | LOVL 1 | 2 | SN-C | 5 |

FIG. 7

520 SLICE MANAGEMENT INFORMATION GROUP MEMORY UNIT

151 SLICE MANAGEMENT INFORMATION

| DISK NODE ID | SLICE ID | FLAG | LOGICAL_VOLUME ID | SEGMENT ID | PAIRED DISK NODE ID | PAIRED SLICE ID |
|---|---|---|---|---|---|---|
| SN-A | 1 | P | LVOL 1 | 1 | SN-B | 1 |
| SN-A | 2 | P | LVOL 1 | 2 | SN-B | 2 |
| ... | ... | ... | ... | ... | ... | ... |
| SN-A | 11 | S | LVOL 2 | 3 | SN-B | 11 |
| SN-A | 12 | S | LVOL 2 | 4 | SN-B | 12 |
| ... | ... | ... | ... | ... | ... | ... |

821 PRE-MIGRATION ENVIRONMENT TABLE

| CLUSTER No. | ENVIRONMENT BEFORE UPDATE | | | |
| --- | --- | --- | --- | --- |
| | CLUSTER CONTROL SOFTWARE | | OS | |
| | SOFTWARE NAME | VERSION NUMBER | SOFTWARE NAME | VERSION NUMBER |
| 1 | APPLICATION A | V2.0 | OS α | V9.0 |
| 2 | APPLICATION A | V2.0 | OS β | V4.4 |
| 3 | APPLICATION A | V2.1 | OS β | V4.4 |

FIG. 11

822 MIGRATION PATTERN DETERMINATION TABLE

| MIGRATION PATTERN | CLUSTER CONTROL SOFTWARE | | | | OS | | | |
|---|---|---|---|---|---|---|---|---|
| | BEFORE MIGRATION | | AFTER MIGRATION | | BEFORE MIGRATION | | AFTER MIGRATION | |
| | SOFTWARE NAME | VERSION NUMBER | SOFTWARE NAME | VERSION NUMBER | SOFTWARE NAME | VERSION NUMBER | SOFTWARE NAME | VERSION NUMBER |
| PT1 | APPLICATION A | V2.1 | APPLICATION A | V2.2 | OS β | V4.4 | OS β | V4.4 |
| PT2 | APPLICATION A | V2.0 | APPLICATION A | V2.1 | OS β | V4.2 | OS β | V4.4 |
| PT3 | APPLICATION A | V2.0 | APPLICATION A | V2.1 | OS α | V9.0 | OS β | V4.4 |

FIG. 12

823 REQUIRED TIME TABLE

| MIGRATION PATTERN | PROCESSING CONTENT IN MIGRATION | REQUIRED TIME |
|---|---|---|
| PT1 | · CLUSTER CONTROL SOFTWARE STOP PROCESS<br>· WRITE PROHIBITION PROCESS<br>· PRIOR RECOVERY PROCESS | THREE SECONDS |
| PT2 | · OS REBOOT PROCESS<br>· WRITE PROHIBITION PROCESS<br>· PRIOR RECOVERY PROCESS | SIX MINUTES |
| PT3 | · TRIPLICATION PROCESS<br>· PROCESS OF SEPARATING FROM SYSTEM<br>· PROGRAM REPLACEMENT PROCESS | ONE HOUR |

824 MESSAGE MANAGEMENT TABLE

| MESSAGE No. | MIGRATION PATTERN | MESSAGE |
|---|---|---|
| M1 | PT2 | WRITING IS PROHIBITED DUE TO SOFTWARE UPDATE FOR A FEW MINUTES |
| M2 | PT3 | PROCESSING CAPACITY IS REDUCED DUE TO SOFTWARE UPDATE FOR ABOUT ONE HOUR |

FIG. 14

825 MIGRATION CONDITION INPUT TABLE

| CLUSTER No. | CLUSTER CONTROL SOFTWARE | | OS | |
| --- | --- | --- | --- | --- |
| | SOFTWARE NAME | VERSION NUMBER | SOFTWARE NAME | VERSION NUMBER |
| 1 | APPLICATION A | V2.1 | OS β | V4.4 |
| 2 | APPLICATION A | V2.1 | OS β | V4.4 |
| 3 | APPLICATION A | V2.2 | OS β | V4.4 |

FIG. 17

826a POST-MIGRATION ENVIRONMENT TABLE

| CLUSTER No. | ENVIRONMENT AFTER UPDATE | | | |
|---|---|---|---|---|
| | CLUSTER CONTROL SOFTWARE | | OS | |
| | SOFTWARE NAME | VERSION NUMBER | SOFTWARE NAME | VERSION NUMBER |
| 1 | APPLICATION A | V2.1 | OS β | V4.4 |
| 2 | APPLICATION A | V2.1 | OS β | V4.4 |
| 3 | APPLICATION A | V2.2 | OS β | V4.4 |

FIG. 19

827a MIGRATION PATTERN TABLE

| CLUSTER No. | MIGRATION PATTERN | REQUIRED TIME | CUSTOMER NOTIFICATION FLAG | MESSAGE No. |
|---|---|---|---|---|
| 1 | PT3 | 3600 | ON | M2 |
| 2 | PT2 | 360 | ON | M1 |
| 3 | PT1 | 3 | OFF | — |

SOFTWARE UPDATE MANAGEMENT APPARATUS AND SOFTWARE UPDATE MANAGEMENT METHOD

CROSS-REFERENCE TO RELATED APPLICATION

This application is based upon and claims the benefit of priority of prior Japanese Patent Application No. 2008-76671, Filed on Mar. 24, 2008, the entire contents of which are incorporated herein by reference.

FIELD

The embodiment discussed herein is related to a computer readable storage medium having stored therein a software update management program, a software update management apparatus, and a software update management method, and more particularly, to a computer readable storage medium having stored therein a software update management program for managing a software update procedure for a disk node in a distributed storage system which performs data management with redundancy using multiple disk nodes, the software update management apparatus, and the software update management method.

BACKGROUND

In a distributed storage system, duplicated data is stored in multiple disk nodes. Thereby, even if a failure occurs in one disk node, system operation can be continued.

However, if the disk node has stopped due to failure, when the data which has been stored in the disk node is updated, only one piece of the duplicated data is updated and the data included in the disk node which has stopped cannot be updated. Consequently, after the disk node which has stopped recovers, the data in the disk node is updated and a duplicated state (redundant configuration) of the data is established. However, in such a case, data redundancy is lost until the disk node in which the failure has occurred is recovered.

In order to maintain the redundant configuration, the data which has been managed by the disk node which has stopped due to the failure needs to be copied to another disk node. Data to be copied can be obtained from a disk node which constitutes the duplication with the disk node which has stopped and manages the same data as the data within the disk node which has stopped.

It should be noted that an amount of data managed by a disk node has become larger in recent years. Thus, it takes a long time to copy all data which has been managed by one disk node. Then, the disk node which has stopped may also be recovered before all data is completely copied. It is inefficient to continuously copy all data also in such a case. Consequently, there is considered a technique in which, among the data which has been managed by the recovered disk node, data which has not been updated during a period of the stop due to the failure is not copied subsequently, and data which is managed by the recovered disk node is set to be valid.

SUMMARY

According to an aspect of the embodiment, a software update management apparatus which executes a software update process for a disk node in a distributed storage system which performs data management with redundancy using multiple disk nodes includes a migration pattern table generation unit and an update unit, the migration pattern table generation unit reads a pre-migration environment table in which a software name and a version number of software before being updated in a target disk node (which is an update target) have been set for each function of the target disk node, and a post-migration environment table in which the software name and the version number of the software after being updated in the target disk node have been set for each function of the target disk node, from a memory device. The migration pattern generation unit judges a migration content indicating a transition of the software name and the version number between before and after the update, for each function of the target disk node, reads a migration pattern determination table in which a correspondence relationship between multiple migration patterns and migration contents to be applied with the migration patterns has been set, from the memory device, and determines a migration pattern to be applied to the target disk node based on the migration content judged by said migration pattern table generation unit and the migration pattern determination table. The multiple migration patterns are classified into a first class migration pattern in which an update of data managed by the target disk node is prohibited and thereby a software update is performed while data redundancy is maintained, and a second class migration pattern in which the data managed by the target disk node is copied to another one of the disk nodes and thereby the software update is performed while the data redundancy is maintained.

The update unit reads the post-migration environment table from the memory device, issues an instruction to the target disk node according to the migration pattern determined by the migration pattern table generation unit, and updates software which executes each function of the target disk node, to the software name and the version number which have been set in the post-migration environment table.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 6 is a diagram showing an example of a data structure of slice management information within a disk node;

FIG. 7 is a diagram showing an example of a data structure of a slice management information group memory unit;

FIG. 10 is a diagram showing an example of a data structure of a pre-migration environment table;

FIG. 11 is a diagram showing an example of a data structure of a migration pattern determination table;

FIG. 12 is a diagram showing an example of a data structure of a required time table;

FIG. 14 is a diagram showing an example of a data structure of a migration condition input table;

FIG. 17 is a diagram showing an example of a data structure of a post-migration environment table;

FIG. 19 is a diagram showing an example of a data structure of a migration pattern table;

DESCRIPTION OF EMBODIMENT

Hereinafter, an embodiment of the present invention will be described with reference to the drawings.

Figure 1:
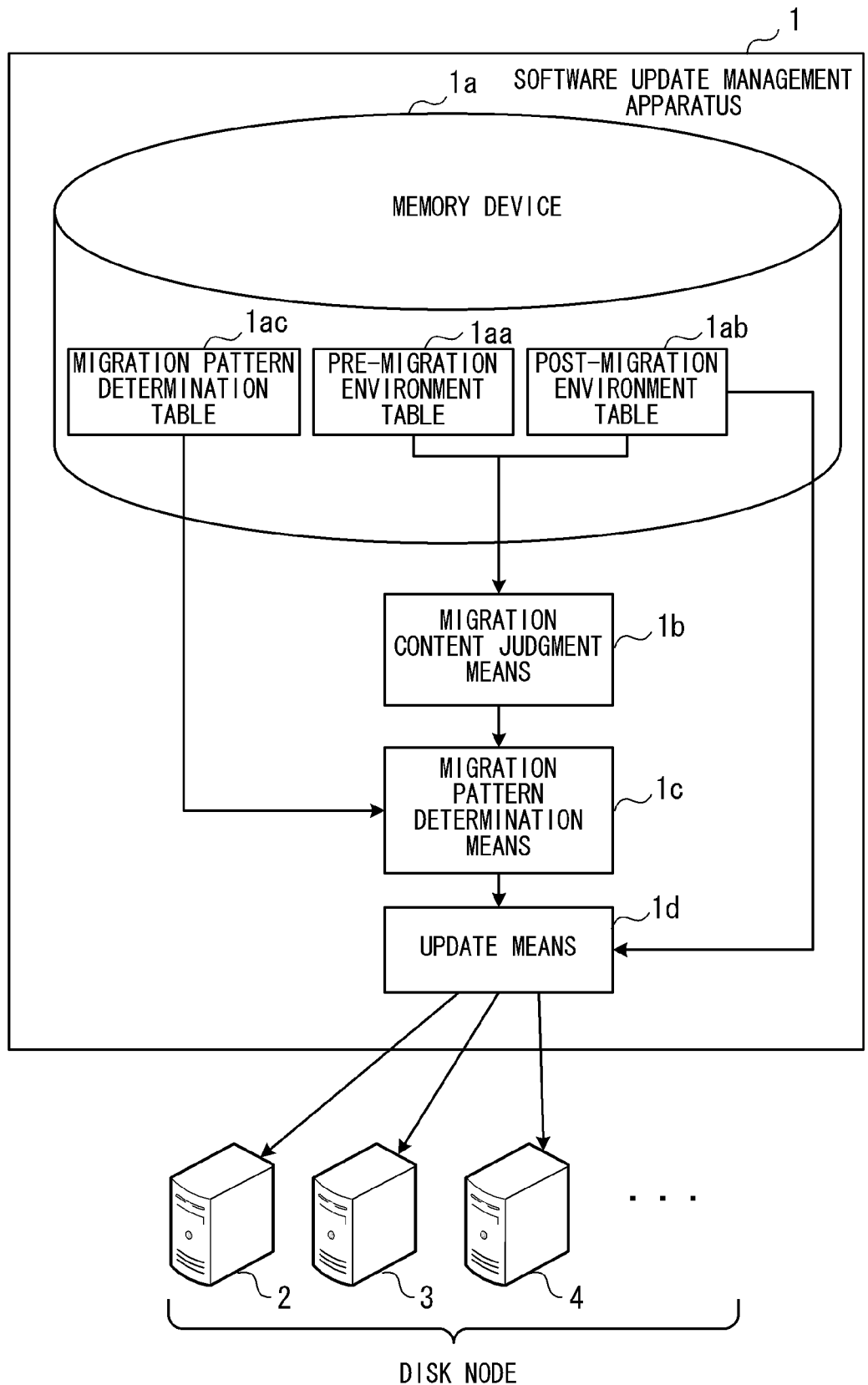
FIG. 1 is a diagram showing a summary of an embodiment.

FIG. 1 is a diagram showing a summary of the embodiment. A software update management apparatus 1 manages a software update procedure for a disk node in a distributed storage system which performs data management with redundancy using multiple disk nodes 2, 3, 4, . . . The software update management apparatus 1 is provided with a function for preventing complete duplication of data from being compromised when an update such as upgrading, patch application or the like for an operating system or application software is performed. In other words, the software update management apparatus 1 has a memory device 1$a$, migration content judgment means (migration content judgment unit) 1$b$, migration pattern determination means (migration pattern determination unit) 1$c$ and update means (update unit) 1$d$. In the example of FIG. 1, although the memory device 1$a$ is integrated in the software update management apparatus 1, another computer connected to the software update management apparatus 1 via a network may have the memory device 1$a$.

In the memory device 1$a$, a pre-migration environment table 1$aa$, a post-migration environment table 1$ab$, and a migration pattern determination table 1$ac$ have been stored. In the pre-migration environment table 1$aa$, a software name and a version number of software before being updated in a target disk node (which is an update target) have been set for each function of the target disk node. In the post-migration environment table 1$ab$, the software name and the version number of the software after being updated in the target disk node have been set for each function of the target disk node.

In the migration pattern determination table 1$ac$, a correspondence relationship between multiple migration patterns and migration contents to be applied with the migration patterns has been set. The multiple migration patterns are classified into a first class migration pattern in which an update of data managed by the target disk node is prohibited and thereby a software update is performed while data redundancy is maintained, and a second class migration pattern in which the data managed by the target disk node is copied to another disk node and thereby the software update is performed while the data redundancy is maintained. For example, in the migration pattern determination table 1$ac$, application of a migration pattern belonging to the first class migration pattern has been set to a migration content in which a time required for the software update is equal to or less than a predetermined time, and application of a migration pattern belonging to the second class migration pattern has been set to a migration content in which the time required for the software update is more than the predetermined time.

In the example of FIG. 1, although the pre-migration environment table 1$aa$, the post-migration environment table 1$ab$, and the migration pattern determination table 1$ac$ have been stored in one memory device 1$a$, the pre-migration environment table 1$aa$, the post-migration environment table 1$ab$, the migration pattern determination table 1$ac$ may be stored in individual memory devices, respectively.

The migration content judgment means 1$b$ reads the pre-migration environment table 1$aa$ and the post-migration environment table 1$ab$ from the memory device 1$a$, and judges a migration content indicating a transition of the software name and the version number between before and after the update, for each function of the target disk node.

The migration pattern determination means 1$c$ reads the migration pattern determination table 1$ac$ from the memory device 1$a$, and determines a migration pattern to be applied to the target disk node based on the migration content judged by the migration content judgment means 1$b$ and the migration pattern determination table 1$ac$.

The update means 1$d$ reads the post-migration environment table 1$ab$ from the memory device, issues an instruction to the target disk node 2 according to the migration pattern determined by the migration pattern determination means 1$c$, and updates software which executes each function of the target disk node 2, to the software name and the version number which have been set in the post-migration environment table 1$ab$.

According to the software update management apparatus as described above, the migration content for each function of the target disk node is judged by the migration content judgment means 1$b$. Next, the migration pattern to be applied to the target disk node is determined by the migration pattern determination means 1$c$. Then, the instruction is issued to the target disk node according to the migration pattern determined by the migration pattern determination means 1$c$, and the software which executes each function of the target disk node is updated to the software name and the version number which have been set in the post-migration environment table 1$ab$, by the update means 1$d$.

In this way, since the migration pattern is determined depending on contents of the migration pattern determination table 1$ac$, an appropriate migration pattern depending on the migration content can be applied. In other words, in the migration pattern determination table 1$ac$, the correspondence relationship has been set so that the first class migration pattern is applied to the migration content which can be updated in a short time, and the correspondence relationship has been set so that the second class migration pattern is applied to the migration content which requires a long time for the update. Thereby, in the case of the migration content which can be updated in a short time, the update of the data managed by the target disk node is prohibited, and thereby the software update is performed while the data redundancy is maintained. In this case, since the data redundancy is maintained only by prohibiting writing, only a small processing load due to the software update is imposed on the entire system.

Moreover, in the case of the migration content which requires a long time for the update, the data managed by the target disk node is copied to another disk node, and thereby the software update is performed while the data redundancy is maintained. Thereby, even if the function of the target disk node stops, the data redundancy is maintained.

In this way, if the update can be performed in a short time, only the writing of the data is temporarily prohibited, and the data in the disk node is not copied. As a result, an efficient software update becomes possible while the redundancy is maintained.

Incidentally, in the distributed storage system in which the data is stored in the multiple disk nodes, a management node for managing an overall operation is provided. The function of the software update management apparatus 1 shown in FIG. 1 can be embedded in this management node. Consequently, details of the present embodiment will be described by using an example of the distributed storage system which performs software update management with the management node.

Figure 2:
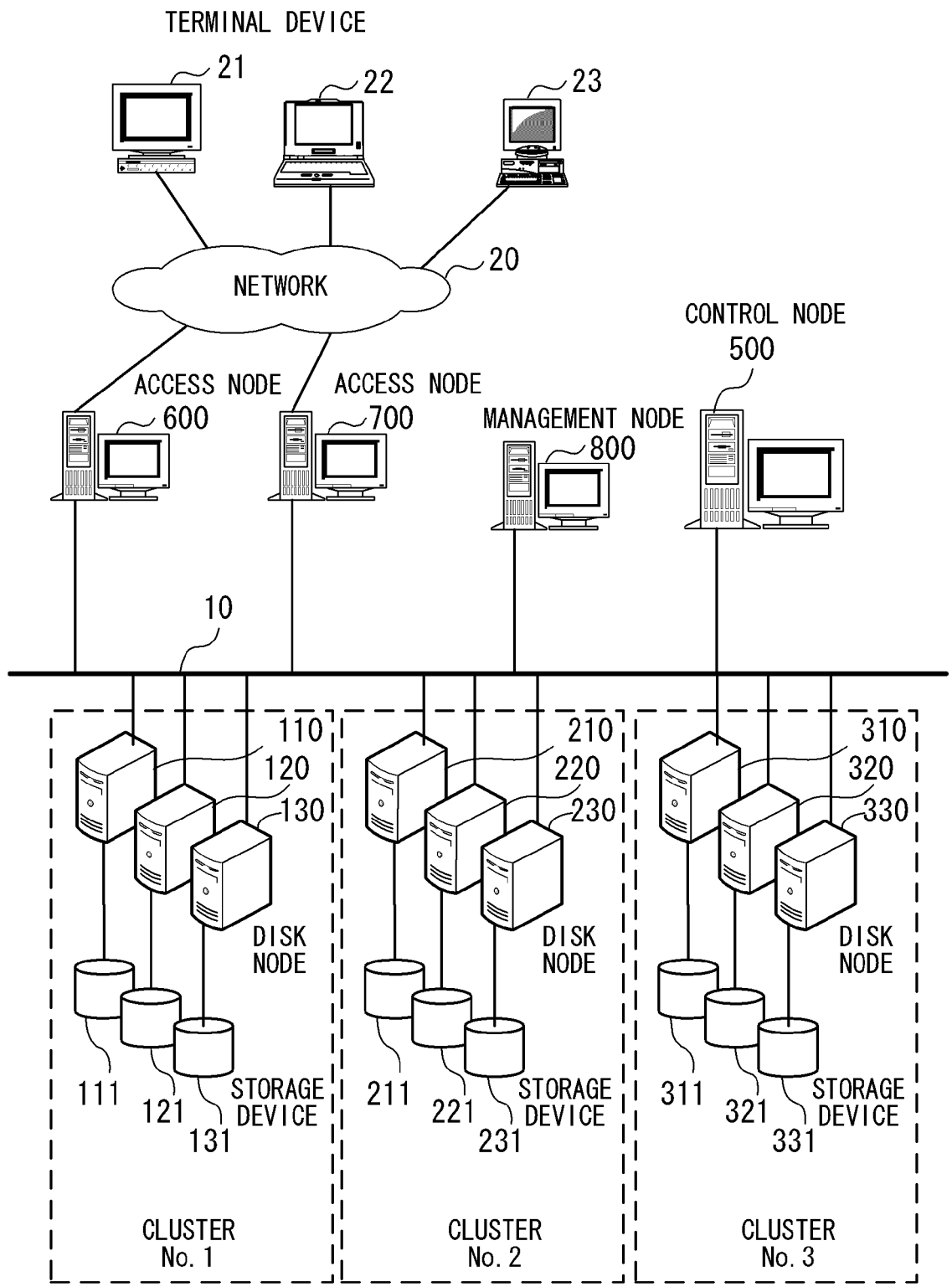
FIG. 2 is a diagram showing a configuration example of a distributed storage system of the present embodiment.

FIG. 2 is a diagram showing a configuration example of the distributed storage system of the present embodiment. In the present embodiment, multiple disk nodes 110, 120, 130, 210, 220, 230, 310, 320 and 330, a control node 500, access nodes 600 and 700, and a management node 800 are connected via a network 10. Storage devices 111, 121, 131, 211, 221, 231, 311, 321 and 331 are connected to the disk nodes 110, 120, 130, 210, 220, 230, 310, 320 and 330, respectively.

Multiple hard disk devices (HDDs) are implemented in the respective storage devices 111, 121, 131, 211, 221, 231, 311, 321 and 331. Each of the storage devices 111, 121, 131, 211, 221, 231, 311, 321 and 331 is a RAID system using an integrated HDD.

The disk nodes 110, 120, 130, 210, 220, 230, 310, 320 and 330 are, for example, computers with an architecture referred to as IA (Intel Architecture). The disk nodes 110, 120, 130, 210, 220, 230, 310, 320 and 330 manage data stored in the connected storage devices 111, 121, 131, 211, 221, 231, 311, 321 and 331, and provide the managed data to terminal devices 21, 22 and 23 via the network 10. Moreover, the disk nodes 110, 120, 130, 210, 220, 230, 310, 320 and 330 manage redundant data. In other words, the same data is managed by at least two disk nodes.

The control node 500 manages the disk nodes 110, 120, 130, 210, 220, 230, 310, 320 and 330. For example, when the control node 500 receives a new remote logical volume assignment request from the management node 800, the control node 500 defines a new remote logical volume and notifies the disk nodes 110, 120, 130, 210, 220, 230, 310, 320 and 330 and the access nodes 600 and 700 of contents of the definition. Thereby, the access nodes 600 and 700 can access the disk nodes 110, 120, 130, 210, 220, 230, 310, 320 and 330 via the newly defined remote logical volume.

The multiple terminal devices 21, 22 and 23 are connected to the access nodes 600 and 700 via a network 20. In the access nodes 600 and 700, a local logical volume and a remote logical volume have been defined. Then, in response to a request for accessing data on the local logical volume, from the terminal devices 21, 22 and 23, the access nodes 600 and 700 access the data managed by the disk nodes 110, 120, 130, 210, 220, 230, 310, 320 and 330 which have been defined by the remote logical volume.

The management node 800 is a computer used by an administrator for managing the operation of the distributed storage system. In the management node 800, a kind and the version number of software in the disk nodes 110, 120, 130, 210, 220, 230, 310, 320 and 330 are managed. Then, the management node 800 manages the update of the software implemented in the disk nodes 110, 120, 130, 210, 220, 230, 310, 320 and 330.

It should be noted that, in the present embodiment, the respective disk nodes 110, 120, 130, 210, 220, 230, 310, 320 and 330 have been classified into multiple cluster groups. In the example of FIG. 2, one cluster group has been composed of the disk nodes 110, 120 and 130, and has been assigned with an identifier of the cluster group "cluster No. 1". Moreover, one cluster group has been composed of the disk nodes 210, 220 and 230, and has been assigned with an identifier of the cluster group "cluster No. 2". Similarly, one cluster group has been composed of the disk nodes 310, 320 and 330, and has been assigned with an identifier of the cluster group "cluster No. 3".

Figure 3:
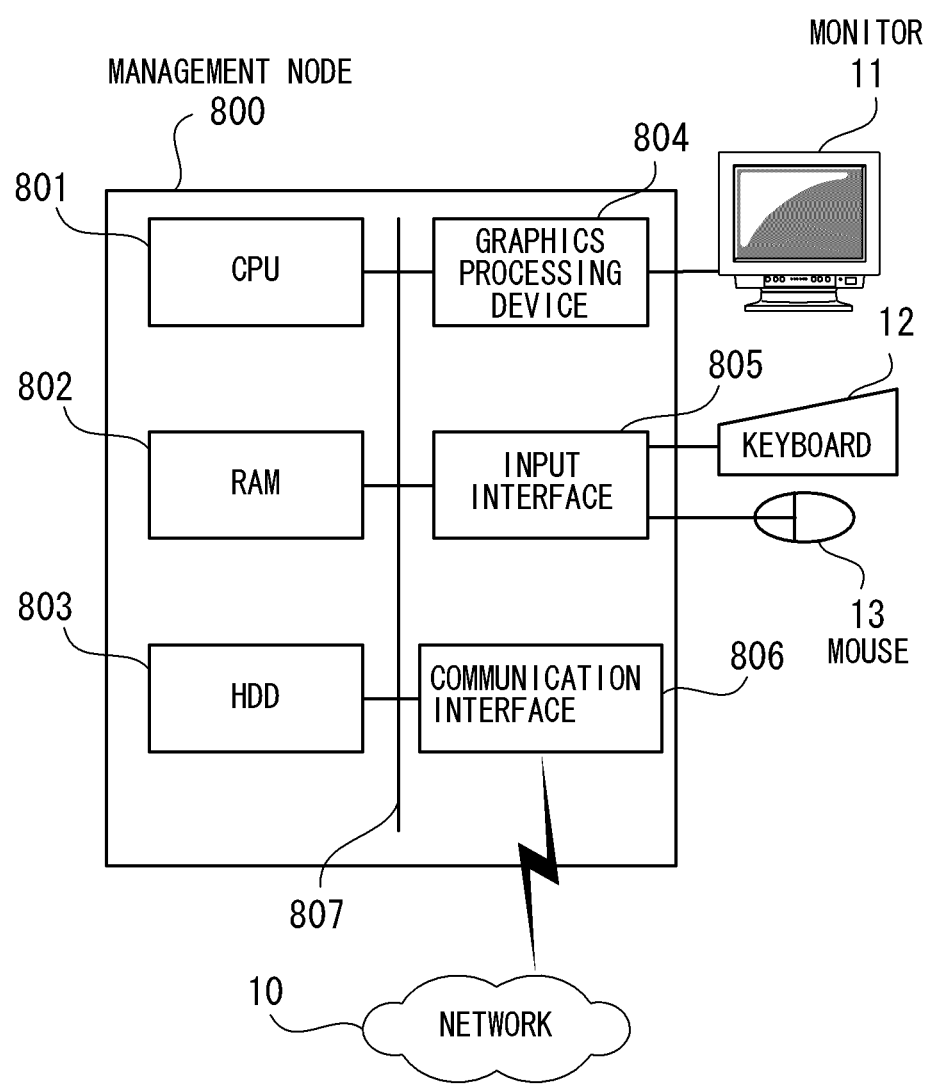
FIG. 3 is a diagram showing a hardware configuration example of a management node used in the present embodiment.

FIG. 3 is a diagram showing a hardware configuration example of the management node used in the present embodiment. In the management node 800, an entire device is controlled by a CPU (Central Processing Unit) 801. To the CPU 801, a RAM (Random Access Memory) 802, a hard disk drive (HDD) 803, a graphics processing device 804, an input interface 805, and a communication interface 806 are connected via a bus 807.

The RAM 802 is used as a primary memory device in the management node 800. In the RAM 802, at least a part of a program of an OS (Operating System) and an application program which are caused to be executed by the CPU 801 is temporarily stored. Moreover, in the RAM 802, various data required for processes performed by the CPU 801 is stored. The HDD 803 is used as a secondary memory device in the management node 800. In the HDD 803, the program of the OS, the application program and the various data are stored. It should be noted that a semiconductor memory device such as a flash memory can also be used as the secondary memory device.

A monitor 11 is connected to the graphics processing device 804. The graphics processing device 804 displays an image on a screen of the monitor 11 according to an instruction from the CPU 801. As the monitor 11, there are a display device using a CRT (Cathode Ray Tube) and a liquid crystal display device.

A keyboard 12 and a mouse 13 are connected to the input interface 805. The input interface 805 transmits a signal transmitted from the keyboard 12 or the mouse 13 to the CPU 801 via the bus 807. It should be noted that the mouse 13 is an example of a pointing device, and another pointing device can also be used. As another pointing device, there are a touch panel, a tablet, a touch pad, a track ball and the like.

The communication interface 806 is connected to the network 10. The communication interface 806 transmits the data to and receives the data from another node via the network 10.

It should be noted that, although the hardware configuration of the management node 800 has been shown in FIG. 3, the disk nodes 110, 120, 130, 210, 220, 230, 310, 320 and 330, the control node 500, and the access nodes 600 and 700 can also be realized with similar hardware configurations.

According to the hardware configurations as described above, the distributed storage system can be realized. The distributed storage system functions as virtual volumes (hereinafter referred to as "logical volumes") for the terminal devices 21 to 23. The logical volumes are generated for the respective cluster groups.

Figure 4:
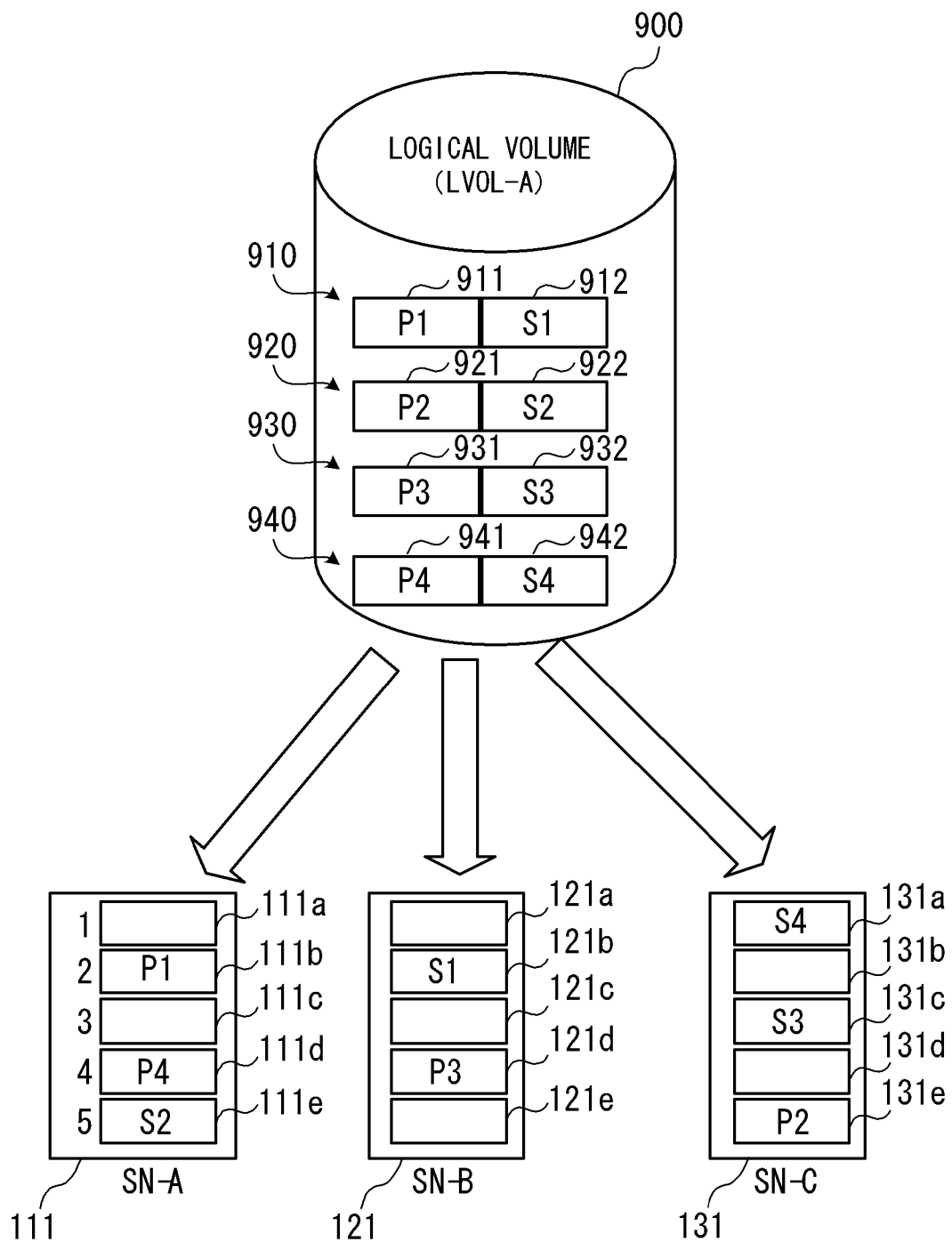
FIG. 4 is a diagram showing a data structure of a logical volume.

FIG. 4 is a diagram showing a data structure of the logical volume. FIG. 4 shows a logical volume 900 configured in the cluster group of "cluster No. 1". The logical volume 900 has been attached with an identifier (logical volume identifier) of "LVOL-A". Moreover, three disk nodes 110, 120 and 130 connected via the network have been attached with node identifiers of "SN-A", "SN-B" and "SN-C", respectively, for identification of the individual disk nodes.

In each of the storage devices 111, 121 and 131 included in each of the disk nodes 110, 120 and 130, a RAID 5 logical disk is configured. This logical disk has been divided into five slices and is managed within the individual disk node.

In an example of FIG. 4, a memory area included in the storage device 111 has been divided into five slices 111a, 111b, 111c, 111d and 111e. A memory area included in the storage device 121 has been divided into five slices 121a, 121b, 121c, 121d and 121e. A memory area included in the storage device 131 has been divided into five slices 131a, 131b, 131c, 131d and 131e.

It should be noted that the logical volume 900 is composed of units of segments 910, 920, 930 and 940. Memory capacities of the segments 910, 920, 930 and 940 are the same as memory capacities of the slices which are management units in the storage devices 111, 121 and 131. For example, if it is assumed that the memory capacity of the slice is one gigabyte, the memory capacity of the segment is also one gigabyte. A memory capacity of the logical volume 900 is an integral multiple of the memory capacity of one segment. For example, if the memory capacity of the segment is one gigabyte, the memory capacity of the logical volume 900 becomes four gigabytes or the like.

The segments 910, 920, 930 and 940 are composed of sets of primary slices 911, 921, 931 and 941 and secondary slices 912, 922, 932 and 942, respectively. The slices belonging to the same segment belong to separate disk nodes. Each slice is managed based on slice management information. The slice management information includes the logical volume identifier, segment information, information on a slice constituting the same segment, a flag indicating whether the slice is the primary slice or the secondary slice, and the like.

In the example of FIG. 4, an identifier for identifying an attribute of the slice is indicated by a combination of an alphabet of "P" or "S" and a number. "P" indicates that the slice is the primary slice. "S" indicates that the slice is the secondary slice. The number following the alphabet represents what number segment the slice belongs to. For example, the primary slice of the first segment 910 is indicated by "P1", and the secondary slice thereof is indicated by "S1".

Each of the primary slices and the secondary slices in the logical volume 900 with such a structure is caused to correspond to any of the slices within the storage devices 111, 121 and 131. For example, the primary slice 911 in the segment 910 is caused to correspond to the slice 111b in the storage device 111, and the secondary slice 912 is caused to correspond to the slice 121b in the storage device 121.

Then, in each of the storage devices 111, 121 and 131, data in the primary slice or the secondary slice corresponding to its own slice is stored.

Figure 5:
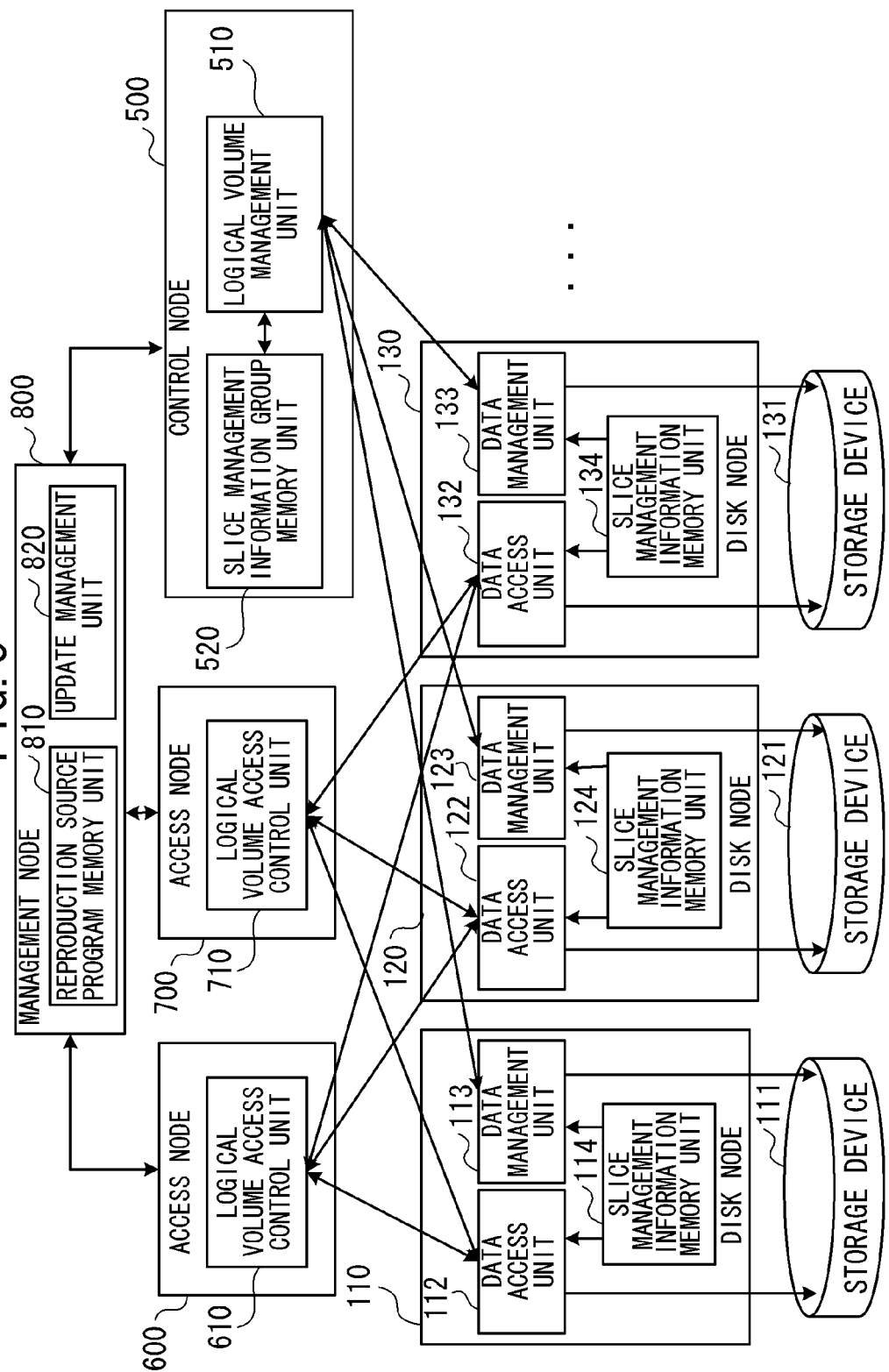
FIG. 5 is a block diagram showing functions of respective devices in the distributed storage system.

FIG. 5 is a block diagram showing functions of respective devices in the distributed storage system. The access node 600 has a logical volume access control unit 610. In response to an access request in which data within the logical volume 900 has been specified, from the terminal devices 21, 22 and 23, the logical volume access control unit 610 performs data access to the disk node managing the specified data. Specifically, the logical volume access control unit 610 identifies the segment in which access target data has been stored, within the logical volume 900. Next, the logical volume access control unit 610 identifies the disk node and the slice within the disk node which correspond to the primary slice constituting the identified segment in the logical volume 900. Then, the logical volume access control unit 610 outputs a request for accessing the identified slice, to the identified disk node.

Moreover, the logical volume access control unit 610 has a data cache (a memory area which temporarily stores the access target data) for accessing the disk nodes 110, 120, 130, . . . . In a read cache, data which has been recently read is stored. For a read request for the data stored in the read cache, the logical volume access control unit 610 can obtain the data from the read cache even while the disk node managing appropriate data is being updated.

The access node 700 also has a logical volume access control unit 710. A function of the logical volume access control unit 710 is similar to that of the logical volume access control unit 610 in the access node 600.

The control node 500 has a logical volume management unit 510 and a slice management information group memory unit 520.

The logical volume management unit 510 manages the slices within the storage devices 111, 121, 131, . . . included in the disk nodes 110, 120, 130, . . . . For example, the logical volume management unit 510 transmits a slice management information obtaining request to the disk nodes 110, 120, 130, . . . on start-up of the system. Then, the logical volume management unit 510 stores the slice management information sent back in response to the slice management information obtaining request, in the slice management information group memory unit 520.

The slice management information group memory unit 520 is a memory device which stores the slice management information collected from the disk nodes 110, 120, 130, . . . . For example, a part of a memory area of a RAM within the control node 500 is used as the slice management information group memory unit 520.

The disk node 110 has a data access unit 112, a data management unit 113, and a slice management information memory unit 114.

The data access unit 112 accesses the data within the storage device 111 in response to the request from the access node 600. Specifically, if the data access unit 112 has received a data read request from the access node 600, the data access unit 112 obtains the data specified in the read request, from the storage device 111, and transmits the data to the access node 600. Moreover, if the data access unit 112 has received a data write request from the access node 600, the data access unit 112 stores the data included in the write request, within the storage device 111. It should be noted that if the data has been written by the data access unit 112 based on the write request, the data management unit 113 in the disk node 110 operates in cooperation with the data management unit in the disk node managing the secondary slice corresponding to the slice (primary slice) in which the data has been written, and also updates the data within the secondary slice.

Furthermore, in response to the slice management information obtaining request from the logical volume management unit 510, the data management unit 113 transmits the slice management information stored in the slice management information memory unit 114 to the logical volume management unit 510.

The slice management information memory unit 114 is a memory device which stores the slice management information. For example, a part of a memory area within a RAM is used as the slice management information memory unit 114. It should be noted that the slice management information which is stored in the slice management information memory unit 114 is stored within the storage device 111 when the system stops, and read into the slice management information memory unit 114 on the start-up of the system.

Other disk nodes 120, 130, . . . have a function similar to that of the disk node 110. In other words, the disk node 120 has a data access unit 122, a data management unit 123, and a slice management information memory unit 124. The disk node 130 has a data access unit 132, a data management unit 133, and a slice management information memory unit 134. Each element within the disk nodes 120, 130, . . . has the same function as that of the element with the same name within the disk node 110.

The management node 800 has a reproduction source program memory unit 810 and an update management unit 820. The reproduction source program memory unit 810 is a memory function for storing a reproduction source program for the software update. For example, a part of a memory area of the HDD 803 is used as the reproduction source program memory unit 810. The update management unit 820 manages the version number of the software implemented in each of the disk nodes 110, 120, 130, . . . . Then, when the software is updated, the update management unit 820 updates the software in the disk nodes 110, 120, 130, . . . with a procedure depending on the time required for the update. It should be noted that, in FIG. 5, in order to avoid a complicated mixture of relationship lines, relationship lines connecting the management node 800 and the respective disk nodes 110, 120, 130, . . . have been omitted.

Next, information required for managing the logical volume in the distributed storage system will be described.

FIG. 6 is a diagram showing an example of a data structure of the slice management information within the disk node. In the slice management information memory unit 114, slice management information 114a has been stored.

The slice management information 114a is a data table in which management information on data stored in a storage area divided in units of the slices within the storage device 111 has been registered. In the slice management information 114a, fields of "disk node ID", "slice ID", "flag", "logical volume ID", "segment ID", "paired disk node ID", and "paired slice ID" have been provided.

In the field of "disk node ID", the node identifier of the disk node 110 including the slice management information 114a is registered. In the field of "slice ID", a slice number for uniquely identifying each slice within the storage device 111 is set. In the field of "flag", a flag indicating whether the slice within the remote logical volume corresponding to the slice indicated by the slice ID is the primary slice or the secondary slice is set. In the example of FIG. 6, the primary slice is represented as "P", and the secondary slice is represented as "S".

In the field of "logical volume ID", the logical volume identifier indicating the remote logical volume corresponding to the slice indicated by the slice ID is set. In the field of "segment ID", a segment number indicating the segment within the remote logical volume corresponding to the slice indicated by the slice ID is set.

In the field of "paired disk node ID", the node identifier of the disk node in which a slice paired with the slice indicated by the slice ID (a slice constituting the same segment) is stored is set. In the field of "paired slice ID", a slice number for uniquely identifying the slice paired with the slice indicated by the slice ID, within the disk node, is set.

Such slice management information has been stored in each of the disk nodes 110, 120, 130, 210, 220, 230, 310, 320 and 330, and is transmitted to the control node 500 on the start-up of the system. In the control node 500, the slice management information obtained from each of the disk nodes 110, 120, 130, 210, 220, 230, 310, 320 and 330 is stored in the slice management information group memory unit 520.

FIG. 7 is a diagram showing an example of a data structure of the slice management information group memory unit. In the slice management information group memory unit 520, slice management information 521, 522, 523, . . . collected from the disk nodes 110, 120, 130, 210, 220, 230, 310, 320 and 330, respectively, have been stored. A data structure of each of the slice management information 521, 522, 523, . . . is as shown in FIG. 6.

Among the slice management information 521, 522, 523, . . . stored in the slice management information group memory unit 520 as described above, information related to the primary slice (information in which "P" has been set in the field of "flag") is passed from the control node 500 to the access nodes 600 and 700. As a result, in the access nodes 600 and 700, the slices in the disk nodes 110, 120, 130, 210, 220, 230, 310, 320 and 330 which have been assigned to the primary slices of the respective segments constituting the logical volume can be recognized.

Next, a function included in the management node 800 will be described in detail.

Figure 8:
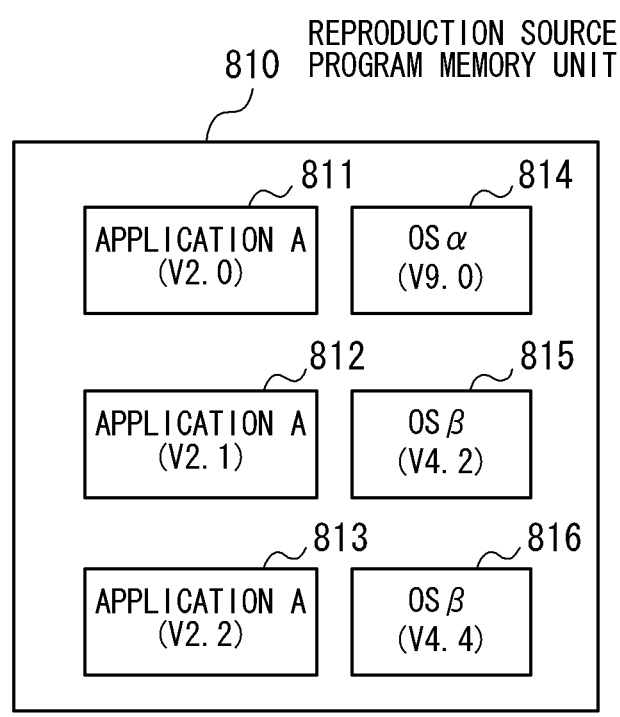
FIG. 8 is a diagram showing an example of a data structure of a reproduction source program memory unit.

FIG. 8 is a diagram showing an example of a data structure of the reproduction source program memory unit. In the reproduction source program memory unit 810, programs 811 to 816 of software to be installed in the disk nodes 110, 120, 130, 210, 220, 230, 310, 320 and 330 have been stored. In the example of FIG. 8, the programs 811 to 813 of each version number of cluster control software and the programs 814 to 816 of operating systems have been stored. The program 811 is a program of a version number "V2.0" of software referred to as "application A". The program 812 is a program of a version number "V2.1" of the software referred to as "application A". The program 813 is a program of a version number "V2.2" of the software referred to as "application A". The program 814 is a program of a version number "V9.0" of software referred to as "OS α". The program 815 is a program of a version number "V4.2" of software referred to as "OS β". The program 816 is a program of a version number "V4.4" of the software referred to as "OS β".

Under the management of the update management unit 820, the software in the disk nodes 110, 120, 130, 210, 220, 230, 310, 320 and 330 is updated by using the programs 811 to 816 stored in the reproduction source program memory unit 810 as described above.

Next, a software update function will be described.

Figure 9:
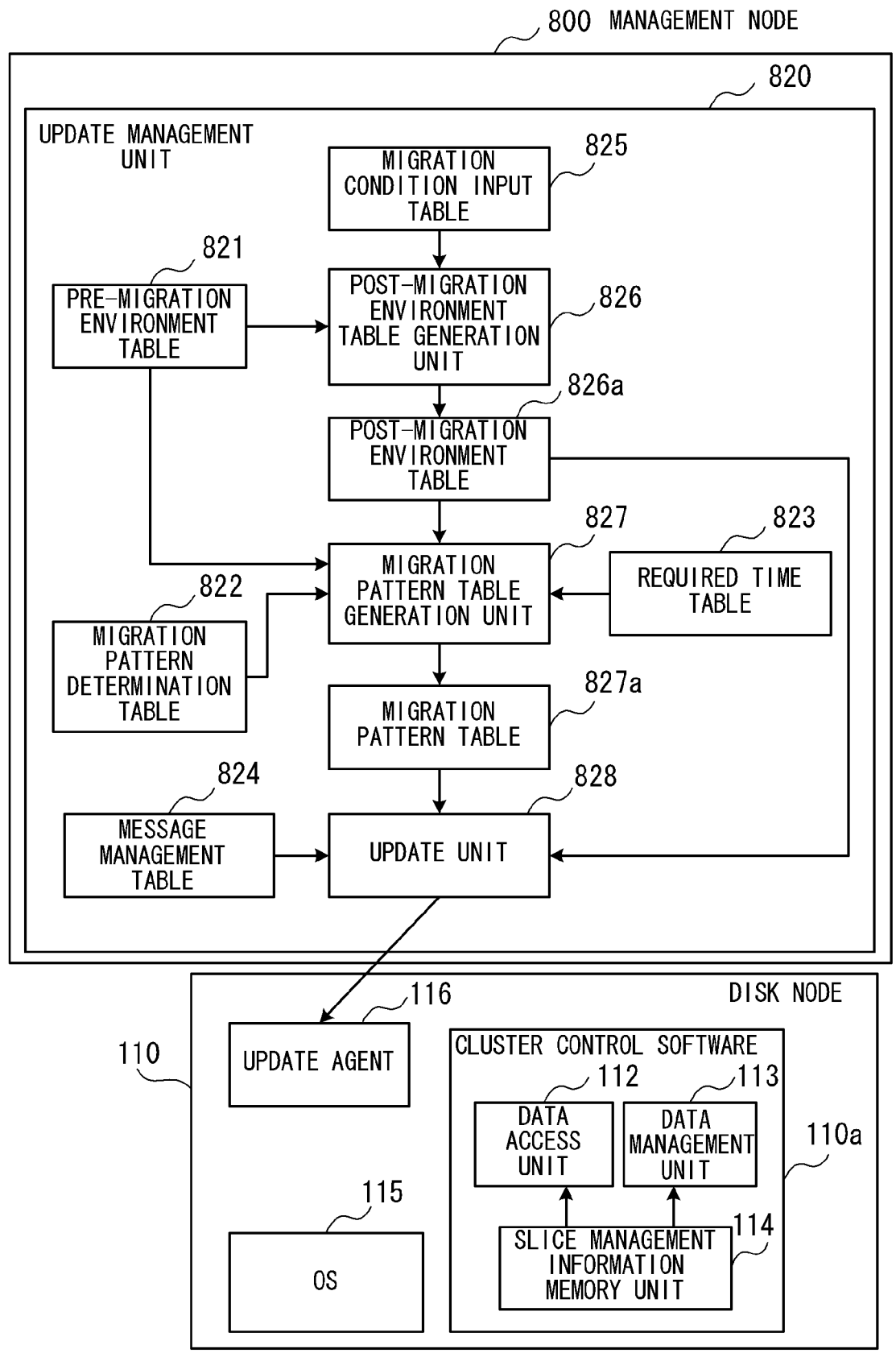
FIG. 9 is a block diagram showing a software update function.

FIG. 9 is a block diagram showing the software update function. The update management unit 820 has a pre-migration environment table 821, a migration pattern determination table 822, a required time table 823, a message management table 824, a migration condition input table 825, a post-migration environment table generation unit 826, a migration pattern table generation unit 827, and an update unit 828.

The pre-migration environment table 821 is a data table in which information on software resources implemented in the respective disk nodes 110, 120, 130, 210, 220, 230, 310, 320 and 330 has been registered. The pre-migration environment table 821 has been previously stored in the HDD 803, and is read into the RAM 802 after start-up of the update management unit 820.

The migration pattern determination table 822 is a data table in which migration patterns depending on contents of the software update have been registered. The migration patterns are combination patterns of processes to be executed at the time of the software update. The migration pattern determination table 822 has been previously stored in the HDD 803, and is read into the RAM 802 after the start-up of the update management unit 820.

The required time table 823 is a data table in which a required time for each migration pattern has been registered. The required time table 823 has been previously stored in the HDD 803, and is read into the RAM 802 after the start-up of the update management unit 820.

The message management table 824 is a data table in which messages to be displayed on the terminal devices 21, 22 and 23 used by a user at the time of the software update have been registered. The registered messages are strings indicating contents for calling attention associated with an update process. The message management table 824 has been previously stored in the HDD 803, and is read into the RAM 802 after the start-up of the update management unit 820.

The migration condition input table 825 is a data table for setting a software environment after the update (migration condition) for each cluster group, when the software update is executed. For the migration condition input table 825, a data structure as a template has been previously prepared in the HDD 803. Then, if the software update is performed, the template is read into the RAM 802 in response to an operation input from the administrator, and the software environment after the update is set by an editing function such as an editor.

When the migration condition is set in the migration condition input table 825, the post-migration environment table generation unit 826 generates a post-migration environment table 826a with reference to the pre-migration environment table 821. The post-migration environment table 826a is a data table in which the software environment of the disk node within each cluster group after the software update has been set. The generated post-migration environment table 826a is stored in the RAM 802.

When the post-migration environment table 826a is generated, the migration pattern table generation unit 827 judges the migration content based on the pre-migration environment table 821 and the post-migration environment table 826a. Next, with reference to the migration pattern determination table 822, the migration pattern table generation unit 827 determines the migration pattern depending on the migration content. Then, the migration pattern table generation unit 827 generates a migration pattern table 827a. The migration pattern table 827a is a data table in which the migration pattern for each cluster group has been registered. The generated migration pattern table 827a is stored in the RAM 802. It should be noted that functions of the migration content judgment means 1b and the migration pattern determination means 1c which have been shown in FIG. 1 are included in the migration pattern table generation unit 827.

In the update unit 828, group information indicating which cluster group each of the disk nodes 110, 120, 130, 210, 220, 230, 310, 320 and 330 belongs to has been previously registered. For example, the group information has been previously stored within the HDD 803, and when the update unit 828 executes the process, the group information is read into the RAM 802. Then, according to the migration pattern for each cluster group which has been set in the generated migration pattern table 827a, the update unit 828 issues a software update instruction for each of the disk nodes 110, 120, 130, 210, 220, 230, 310, 320 and 330. It should be noted that if the message is displayed on the user's terminal devices 21, 22 and 23 during the software update, the update unit 828 obtains the string of the message from the message management table 824, and transmits the message to the terminal devices 21, 22 and 23. It should be noted that a function of the update means 1d shown in FIG. 1 is included in the update unit 828.

The disk node 110 has an update agent 116. According to the instruction from the update unit 828 in the management node 800, the update agent 116 updates programs of cluster control software 110a and an OS 115. The cluster control software 110a includes the data access unit 112, the data management unit 113, and the slice management information memory unit 114. The update agent 116 periodically refers to the reproduction source program memory unit 810 in the management node 800. When the update agent 116 detects a new program within the reproduction source program memory unit 810, the update agent 116 downloads the new program from the management node 800 and stores the new program in the HDD. Then, according to the instruction from the update unit 828, the update agent 116 performs the update process with the program which has been downloaded.

It should be noted that if the update agent 116 has downloaded the program of the OS, the update agent 116 installs the OS in another partition other than the partition in which a currently-operating OS has been installed, by using the downloaded program. Then, according to the instruction from the update unit 828, the update agent 116 starts up the OS from the partition in which the OS has been newly installed. Thereby, the OS can be migrated.

Next, contents of the data tables which have been previously included in the update management unit 820 will be described.

FIG. 10 is a diagram showing an example of a data structure of the pre-migration environment table. In the pre-migration environment table 821, fields of "cluster No." and "environment before update" have been provided.

In the field of "cluster No.", the identifier of the cluster group is set. In the field of "environment before update", the software resources operating in the disk nodes within the corresponding cluster group have been set.

The field of "environment before update" has been divided into fields of "cluster control software" and "OS". In the field of "cluster control software", fields of "software name" and "version number" have been further provided, and a name and a version number of cluster control software which has been implemented in the disk node are set in the respective fields. In the field of "OS", fields of "software name" and "version number" have been further provided, and a name and a version number of an OS which has been implemented in the disk node are set in the respective fields.

FIG. 11 is a diagram showing an example of a data structure of the migration pattern determination table. In the migration pattern determination table 822, fields of "migration pattern", "cluster control software" and "OS" have been provided. In the field of "migration pattern", an identifier of the migration pattern is set.

In the field of "cluster control software", a combination pattern of the cluster control software before the migration and the cluster control software after the migration is set. Specifically, the field of "cluster control software" has been divided into fields of "before migration" and "after migration". In the fields of "before migration" and "after migration", fields of "software name" and "version number" have been provided, respectively. In the field of "before migration", the software name and the version number of the cluster control software before the update are set. In the field of "after migration", the software name and the version number of the cluster control software after the update are set.

In the field of "OS", a combination pattern of the OS before the migration and the OS after the migration is set. Specifically, the field of "OS" has been divided into fields of "before migration" and "after migration". In the fields of "before migration" and "after migration", fields of "software name" and "version number" have been provided, respectively. In the field of "before migration", the software name and the version number of the OS before the update are set. In the field of "after migration", the software name and the version number of the OS after the update are set.

If a software update matching a migration content (a change in the environment between before and after the migration) indicated by the combination patterns of the software before and after the migration, which have been set in the field of "cluster control software" and the field of "OS", is performed, the migration pattern which has been caused to correspond to the migration content is applied.

In the example of FIG. 11, three kinds of migration patterns have been defined. "PT1" indicates a case where the update is completed only by restarting the cluster control software. In other words, if the OS supports the cluster control software after the update, the program of the version number "V2.2" of "application A" has been copied to the disk node, the program of "V2.2" is started up immediately after the program of "V2.1" is stopped, and thereby the update can be performed.

"PT2" indicates a case where version upgrade of the OS is involved. In this case, a new OS has been installed in another partition, and the restart with the new OS is performed.

"PT3" indicates a case where replacement with an OS of a different kind is involved. In order to use the different OS to construct a function similar to that before the update, the disk node of the update target needs to be separated from the system. Consequently, in "PT3", the disk node is separated after data triplication, and the OS is replaced.

FIG. 12 is a diagram showing an example of a data structure of the required time table. In the required time table 823, fields of "migration pattern", "processing content in migration", and "required time" have been provided.

In the field of "migration pattern", the identifier of the migration pattern is set. In the field of "processing content in migration", a processing content at the time of the software update with each migration pattern is set. In the field of "required time", an approximate value of a time required for executing the processing content corresponding to the migration pattern is set.

In the example of FIG. 12, in the case of the migration pattern "PT1", a cluster control software stop process, a write prohibition process, and a prior recovery process are performed as the processing content in the migration, and the required time is three seconds. In the case of the migration pattern "PT2", an OS reboot process, the write prohibition process, and the prior recovery process are performed as the processing content in the migration, and the required time is six minutes. In the case of the migration pattern "PT3", a triplication process, a process of separating the disk node from the distributed storage system, and a program replacement process are performed as the processing content in the migration, and the required time is one hour.

Here, the write prohibition process is a process of prohibiting the writing of the data into the disk node of a software update target. The prior recovery process is a recovery process similar to that performed when a failure occurs. In the prior recovery process at the time of the software update, a failure recovery is started before the failure occurs, in anticipation of a case where the cluster control software cannot be normally started up after the update. If the cluster control software after the update has been normally started up, a process of the failure recovery is aborted.

The triplication process is a process of copying all data managed by the disk node of the update target to another disk node, and temporarily generating a triplicated state of the data. After the triplication process, if the disk node of the target is separated from the distributed storage system, the data which has been stored in the separated disk node is returned to a duplicated state.

The process of separating the disk node from the distributed storage system is a process of canceling the assignment of the slice managed by an appropriate disk node to the logical volume. Since the assignment is canceled, the access from the access nodes 600 and 700 to the disk node is eliminated.

It should be noted that the migration patterns "PT1" and "PT2" maintain the data redundancy by the write prohibition process, and are the migration patterns belonging to the first class migration pattern described in FIG. 1. Moreover, the migration pattern "PT3" maintains the data redundancy by the triplication process, and is the migration pattern belonging to the second class migration pattern described in FIG. 1.

Figure 13:
FIG. 13 is a diagram showing an example of a data structure of a message management table.

FIG. 13 is a diagram showing an example of a data structure of the message management table. In the message management table 824, fields of "message No.", "migration pattern" and "message" have been provided. In the field of "message No.", an identification number of the message is set. In the field of "migration pattern", the migration pattern to which a corresponding message is applied is set. In the field of "message", the string indicating contents of the message to be transmitted to the terminal devices 21, 22 and 23 is set.

In a state where the data as above has been previously registered, based on an operation input to the management node 800 from the administrator of the system, the process of updating the software in the disk nodes 110, 120, 130, 210, 220, 230, 310, 320 and 330 is executed. First, the administrator inputs the migration condition for each client group, to the migration condition input table 825 in the management node 800.

FIG. 14 is a diagram showing an example of a data structure of the migration condition input table. In the migration condition input table 825, fields of "cluster No.", "cluster control software" and "OS" have been provided.

In the field of "cluster No.", the identifier of the cluster group is set. In the field of "cluster control software", fields of "software name" and "version number" have been provided, and a software name and a version number of cluster control software to be installed in the disk node are set, respectively. In the field of "OS", fields of "software name" and "version number" have been provided, and a software name and a version number of an OS to be installed in the disk node are set, respectively.

When the administrator inputs the migration condition to the migration condition input table 825 as described above, and inputs a migration instruction to the management node 800, a software migration process is started by the update management unit 820.

Figure 15:
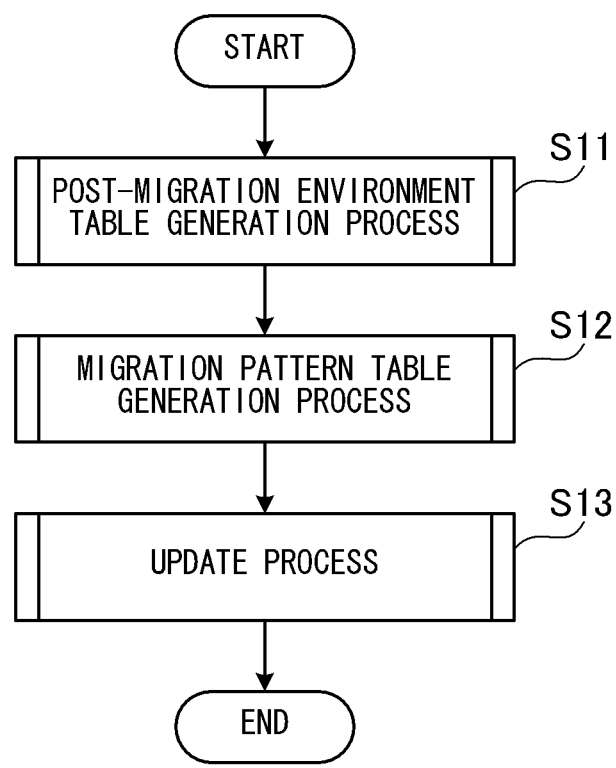
FIG. 15 is a flowchart showing a procedure of a software migration process.

FIG. 15 is a flowchart showing a procedure of the software migration process. Hereinafter, the process shown in FIG. 15 will be described according to step numbers.

[Step S11] The post-migration environment table generation unit 826 generates the post-migration environment table 826a indicating the environment of each disk node after the migration in the case where the migration has been performed according to the migration condition specified in the migration condition input table 825. Details of this process will be described later (see FIG. 16).

[Step S12] The migration pattern table generation unit 827 generates the migration pattern table 827a depending on the post-migration environment table 826a generated by the post-migration environment table generation unit 826. Details of this process will be described later (see FIG. 18).

[Step S13] The update unit 828 executes the process of updating the software in each of the disk nodes 110, 120, 130, 210, 220, 230, 310, 320 and 330, according to the migration pattern set in the migration pattern table 827*a* generated by the migration pattern table generation unit 827. Details of this process will be described later (see FIGS. 20 to 23).

Next, processes at the respective steps of the software migration process will be described in detail.

Figure 16:
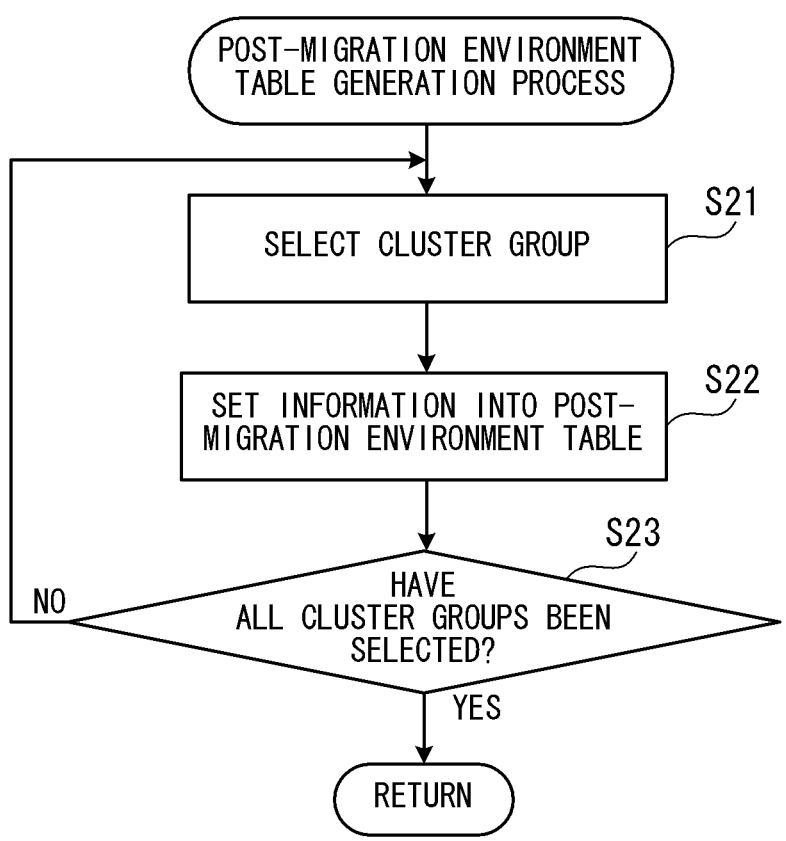
FIG. 16 is a flowchart showing a procedure of a post-migration environment table generation process.

FIG. 16 is a flowchart showing a procedure of the post-migration environment table generation process. Hereinafter, the process shown in FIG. 16 will be described according to the step numbers.

[Step S21] With reference to the migration condition input table 825, the post-migration environment table generation unit 826 selects one cluster group which has not been selected yet, from the cluster groups of which the identifiers have been set in the field of "cluster No.".

[Step S22] The post-migration environment table generation unit 826 extracts information on the cluster group selected at step S21, from the migration condition input table 825, and sets the information into the post-migration environment table 826*a*.

[Step S23] The post-migration environment table generation unit 826 judges whether or not all of the cluster groups set in the migration condition input table 825 have been selected. If all of the cluster groups have been already selected, the post-migration environment table generation process is completed. If there is any cluster group which has not been selected yet, the process proceeds to step S21.

In this way, the post-migration environment table 826*a* is generated.

FIG. 17 is a diagram showing an example of a data structure of the post-migration environment table. In the post-migration environment table 826*a*, fields of "cluster No." and "environment after update" have been provided.

In the field of "cluster No.", the identifier of the cluster group is set. In the field of "environment after update", the software resources operating in the disk nodes within the corresponding cluster group have been set.

The field of "environment after update" has been divided into fields of "cluster control software" and "OS". In the field of "cluster control software", fields of "software name" and "version number" have been further provided, and a name and a version number of cluster control software to be implemented in the disk node are set in the respective fields. In the field of "OS", fields of "software name" and "version number" have been further provided, and a name and a version number of an OS to be implemented in the disk node are set in the respective fields.

Based on the post-migration environment table 826*a* as described above, the migration pattern table 827*a* is generated by the migration pattern table generation unit 827.

Figure 18:
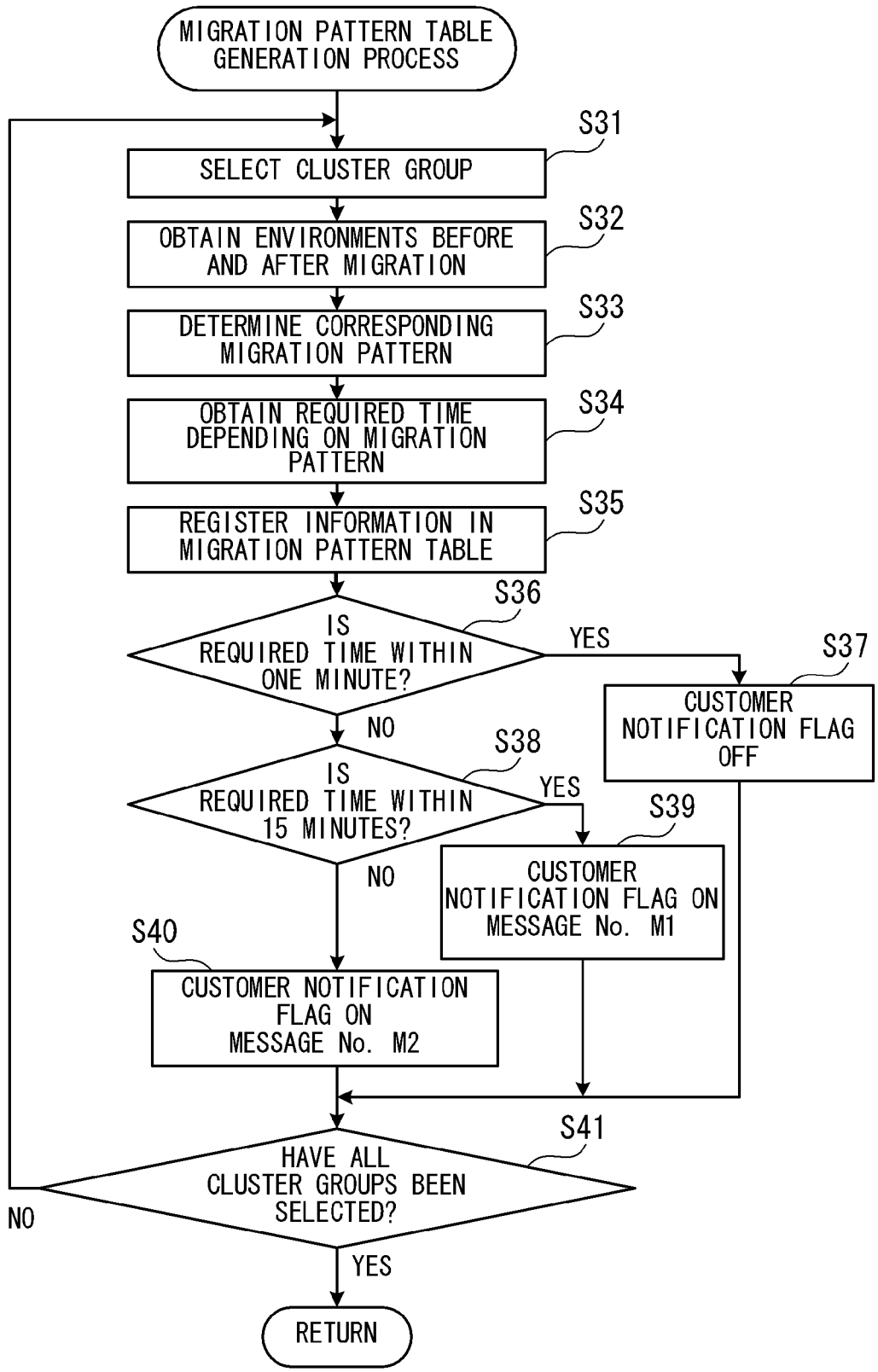
FIG. 18 is a flowchart showing a procedure of a migration pattern table generation process.

FIG. 18 is a flowchart showing a procedure of the migration pattern table generation process. Hereinafter, the process shown in FIG. 18 will be described according to the step numbers.

[Step S31] With reference to the post-migration environment table 826*a*, the migration pattern table generation unit 827 selects one cluster group of which the identifier has been set in the field of "cluster No." and which has not been selected yet.

[Step S32] The migration pattern table generation unit 827 obtains the environments (the software name and the version number) of the cluster group selected at step S31, before and after the migration. Specifically, the migration pattern table generation unit 827 obtains the information related to the selected cluster group, from the pre-migration environment table 821 and the post-migration environment table 826*a*, with the cluster No. as a search key.

[Step S33] The migration pattern table generation unit 827 determines the migration pattern corresponding to the environments before and after the migration. Specifically, the migration pattern table generation unit 827 searches the migration pattern matching the environments before and after the migration, from the migration pattern determination table 822. Then, the migration pattern table generation unit 827 obtains the identifier of the migration pattern including information hit by the search.

[Step S34] With reference to the required time table 823, the migration pattern table generation unit 827 obtains the required time corresponding to the identifier of the migration pattern obtained at step S33.

[Step S35] The migration pattern table generation unit 827 registers each piece of information on the identifier of the cluster group, the identifier of the migration pattern, and the required time, in the migration pattern table 827*a*.

[Step S36] The migration pattern table generation unit 827 judges whether or not the required time obtained at step S34 is within one minute. If the required time is within one minute, the process proceeds to step S37. If the required time is longer than one minute, the process proceeds to step S38.

[Step S37] If the required time is within one minute, the migration pattern table generation unit 827 sets "OFF" to a customer notification flag for the information registered at step S35 in the migration pattern table 827*a*. Subsequently, the process proceeds to step S41.

[Step S38] If the required time is more than one minute, the migration pattern table generation unit 827 judges whether or not the required time is equal to or less than 15 minutes. If the required time is equal to or less than 15 minutes, the process proceeds to step S39. If the required time is longer than 15 minutes, the process proceeds to step S40.

[Step S39] If the required time is longer than one minute and equal to or less than 15 minutes, the migration pattern table generation unit 827 sets "ON" to the customer notification flag and also sets the identification number of the message of "M1", for the information registered at step S35 in the migration pattern table 827*a*. Subsequently, the process proceeds to step S41.

[Step S40] If the required time is longer than 15 minutes, the migration pattern table generation unit 827 sets "ON" to the customer notification flag and also sets the identification number of the message of "M2", for the information registered at step S35 in the migration pattern table 827*a*.

[Step S41] The migration pattern table generation unit 827 judges whether or not all of the cluster groups have been selected. If all of the cluster groups have been selected, the migration pattern table generation process is completed. If there is any cluster group which has not been selected yet, the process proceeds to step S31.

In this way, the migration pattern table 827*a* is generated.

FIG. 19 is a diagram showing an example of a data structure of the migration pattern table. In the migration pattern table 827*a*, fields of "cluster No.", "migration pattern", "required time", "customer notification flag", and "message No." have been provided.

In the field of "cluster No.", the identifier of the cluster group which becomes the software update target is set. In the field of "migration pattern", the migration pattern to be applied to the disk node belonging to the corresponding cluster group is set. In the field of "required time", a time required for updating the software according to the migration pattern to be applied is set.

In the field of "customer notification flag", whether or not to notify a customer of the message at the time of the software update is set. If the customer is notified of the message, the customer notification flag is "ON", and if the customer is not notified of the message, the customer notification flag is "OFF".

When the migration pattern table 827a as described above is generated, the process of updating the software in the disk node is performed by the update unit 828.

Figure 20:
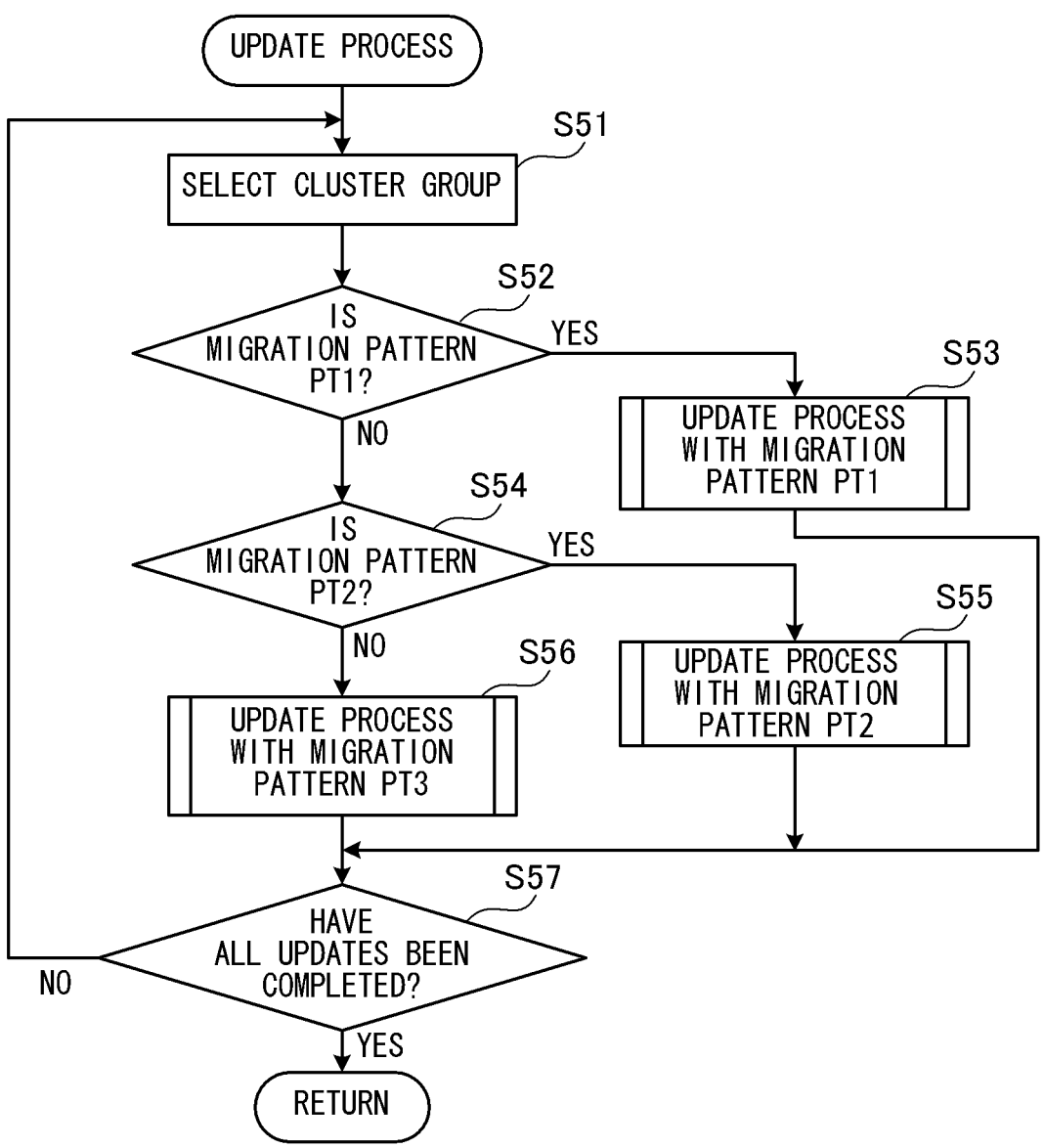
FIG. 20 is a flowchart showing a procedure of an update process.

FIG. 20 is a flowchart showing a procedure of the update process. Hereinafter, the process shown in FIG. 20 will be described according to the step numbers.

[Step S51] The update unit 828 selects one cluster group which has not been selected yet, from the cluster groups of which the identifiers have been set in the migration pattern table 827a.

[Step S52] With reference to the migration pattern table 827a, the update unit 828 judges whether or not the migration pattern to be applied to the selected cluster group is "PT1". If the migration pattern to be applied is "PT1", the process proceeds to step S53. If the migration pattern to be applied is other than "PT1", the process proceeds to step S54.

[Step S53] The update unit 828 executes the update process with the migration pattern "PT1". Details of this process will be described later (see FIG. 21). Subsequently, the process proceeds to step S57.

[Step S54] With reference to the migration pattern table 827a, the update unit 828 judges whether or not the migration pattern to be applied to the selected cluster group is "PT2". If the migration pattern to be applied is "PT2", the process proceeds to step S55. If the migration pattern to be applied is other than "PT2", the process proceeds to step S56.

[Step S55] The update unit 828 executes the update process with the migration pattern "PT2". Details of this process will be described later (see FIG. 22). Subsequently, the process proceeds to step S57.

[Step S56] The update unit 828 executes the update process with the migration pattern "PT3". Details of this process will be described later (see FIG. 23).

Subsequently, the process proceeds to step S57.

[Step S57] The update unit 828 judges whether or not the software updates for all of the cluster groups set in the migration pattern table 827a have been completed. If the updates for all of the cluster groups have been completed, the update process is completed. If there is any cluster group for which the update has not been completed yet, the process proceeds to step S51.

Next, the update process with each migration pattern will be described.

Figure 21:
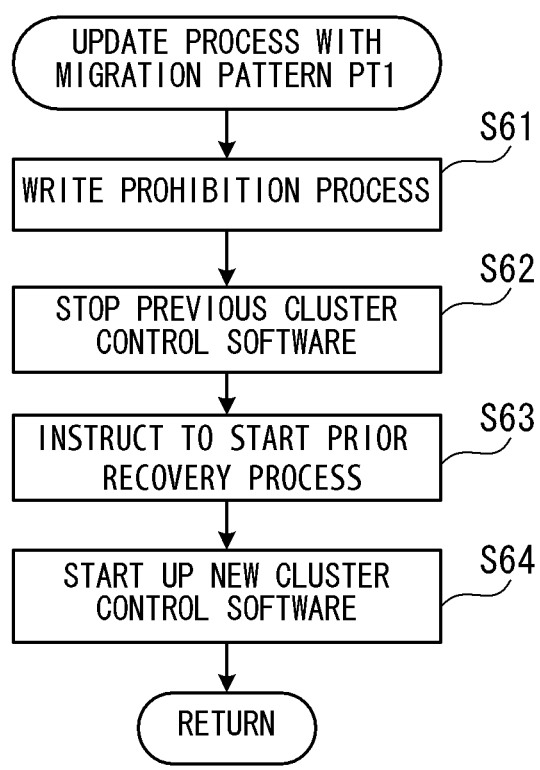
FIG. 21 is a flowchart showing a procedure of the update process with a migration pattern PT1.

FIG. 21 is a flowchart showing a procedure of the update process with the migration pattern "PT1". Hereinafter, the process shown in FIG. 21 will be described according to the step numbers.

[Step S61] The update unit 828 performs the write prohibition process. Specifically, the update unit 828 transmits a write prohibition request to each disk node belonging to the cluster group of the update target. In the disk node which has obtained the write prohibition request, the writing of the data into the storage device is stopped until write prohibition is canceled.

[Step S62] The update unit 828 stops previous cluster control software which is operated in the disk node. Specifically, the update unit 828 transmits a cluster control software stop request to the disk node. The disk node which has received the stop request stops the cluster control software.

[Step S63] The update unit 828 transmits an instruction for starting the prior recovery process, to the control node 500. Thereby, the prior recovery process is started in the control node 500. Since the prior recovery process has been performed, a rapid recovery becomes possible if start-up of new cluster control software fails.

In the control node 500, even without the instruction from the update unit 828, when a heartbeat (a signal which is periodically transmitted for notifying of the start-up) from the disk node stops for a predetermined period of time, the prior recovery process for the data managed by the disk node is automatically started. In the present embodiment, the prior recovery process can be rapidly started without waiting for detection of the stop of the heartbeat, by forcing the prior recovery process to be started by the instruction from the update unit 828.

[Step S64] The update unit 828 starts up the cluster control software of a new version number in the disk node. Specifically, for the disk node, with reference to the post-migration environment table 826a, the update unit 828 obtains the software name and the version number of the cluster control software after the migration. Then, the update unit 828 specifies the software name and the version number after the migration, and transmits a cluster control software start-up request to the disk node. The disk node which has received the start-up request starts up the program of the specified version number of the specified cluster control software. Along with the start-up of the program, the write prohibition process is canceled. Subsequently, the update process with the migration pattern "PT1" is completed.

Figure 22:
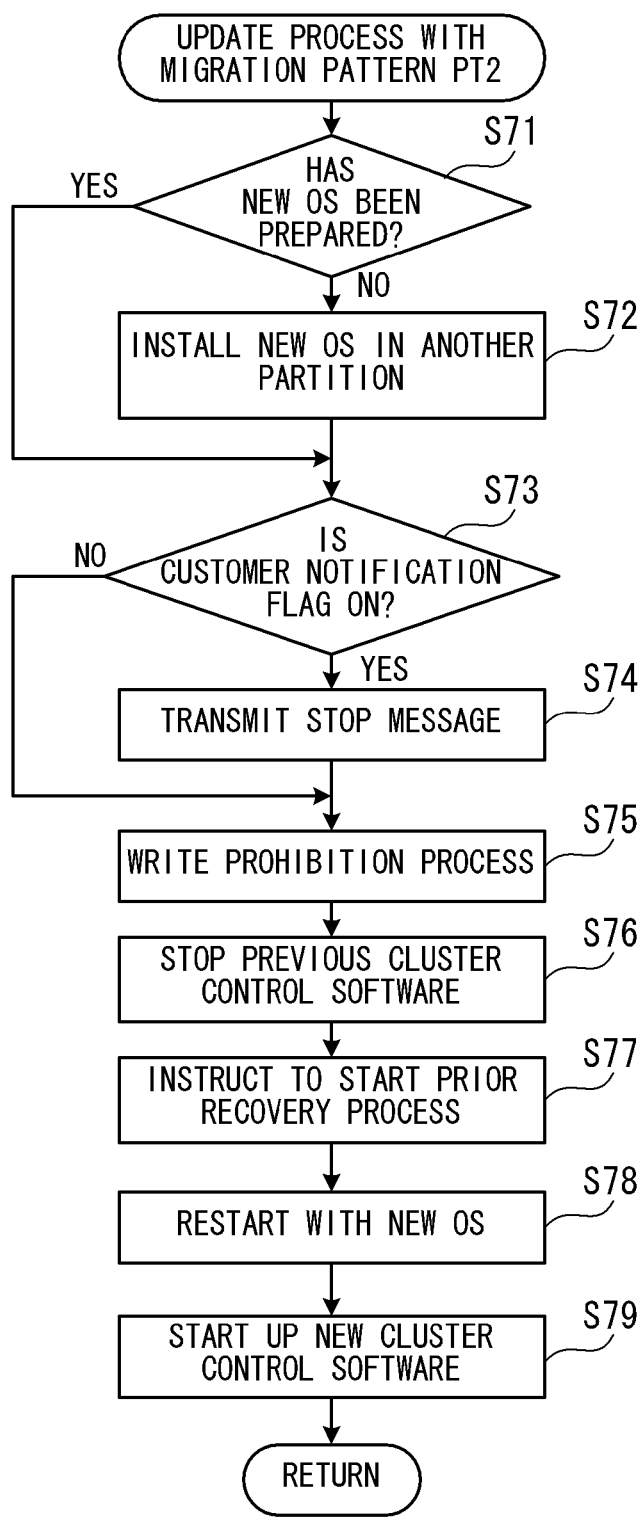
FIG. 22 is a flowchart showing a procedure of the update process with a migration pattern PT2.

FIG. 22 is a flowchart showing a procedure of the update process with the migration pattern "PT2". Hereinafter, the process shown in FIG. 22 will be described according to the step numbers.

[Step S71] The update unit 828 judges whether or not the new OS has been completely prepared in the disk node. Specifically, with reference to the post-migration environment table 826a, the update unit 828 obtains the software name and the version number of the OS after the migration. Then, the update unit 828 inquires the disk node as to whether or not the new OS has been prepared. In response to the inquiry, the disk node indicates whether or not the OS corresponding to the software name and the version number after the migration has been installed in a partition other than the partition in which the currently-operating OS has been installed. If the new OS has been installed in another partition, the update unit 828 judges that the new OS has been prepared. If the new OS has been prepared, the process proceeds to step S73. If the new OS has not been prepared, the process proceeds to step S72.

[Step S72] The update unit 828 installs the OS after the migration, in a partition other than the partition in which the currently-operating OS has been installed. Specifically, the update unit 828 instructs the disk node to install the new OS. The disk node installs the new OS according to the instruction from the update unit 828.

[Step S73] With reference to the migration pattern table 827a, the update unit 828 judges whether or not the customer notification flag for the cluster group of the update target is ON. If the customer notification flag is ON, the process proceeds to step S74. If the customer notification flag is OFF, the process proceeds to step S75. A case where the customer notification flag is OFF while the migration pattern is "PT2" corresponds to a time when a value of the required time for the migration pattern "PT2" has been set to be equal to or less than one minute in the required time table 823. For example, if an OS with limited functions is installed in the disk node, the OS can also be rebooted in a short time. In that case, even with the migration pattern "PT2", the required time for the update may also become within one minute.

[Step S74] If the customer notification flag is ON, the update unit 828 transmits a stop message to the terminal devices 21 to 23. Specifically, with reference to the migration pattern table 827a, the update unit 828 obtains the identification number of the message. Next, with reference to the message management table 824, the update unit 828 obtains a message corresponding to the identification number of the message. Then, the update unit 828 transmits the obtained message to the respective terminal devices 21 to 23 via the access nodes 600 and 700. In the example of FIG. 13, a message indicating that the data writing is prohibited for a predetermined time is transmitted.

[Step S75] The update unit 828 performs the write prohibition process. Specifically, the update unit 828 transmits the write prohibition request to each disk node belonging to the cluster group of the update target. In the disk node which has obtained the write prohibition request, the writing of the data into the storage device is stopped until the write prohibition is canceled.

[Step S76] The update unit 828 stops the previous cluster control software which is operated in the disk node. Specifically, the update unit 828 transmits the cluster control software stop request to the disk node. The disk node which has received the stop request stops the cluster control software.

[Step S77] The update unit 828 transmits the instruction for starting the prior recovery process, to the control node 500. Thereby, the prior recovery process is started in the control node 500.

[Step S78] The update unit 828 performs the restart with the new OS. Specifically, the update unit 828 instructs the disk node to perform the restart with the new OS. Then, the disk node sets the partition in which the new OS has been installed, as a destination into which the OS is read (boot destination) at the time of the next start-up. Subsequently, the disk node executes the restart instruction in the currently-operating OS. Then, in the disk node, after the currently-operating OS is stopped (shut down), the new OS is started up.

[Step S79] The update unit 828 starts up the cluster control software of the new version number in the disk node. Specifically, for the disk node, with reference to the post-migration environment table 826a, the update unit 828 obtains the software name and the version number of the cluster control software after the migration. Then, the update unit 828 specifies the software name and the version number after the migration, and transmits the cluster control software start-up request to the disk node. The disk node which has received the start-up request starts up the program of the specified version number of the specified cluster control software. Along with the start-up of the program, the write prohibition process is canceled. Subsequently, the update process with the migration pattern "PT2" is completed.

Figure 23:
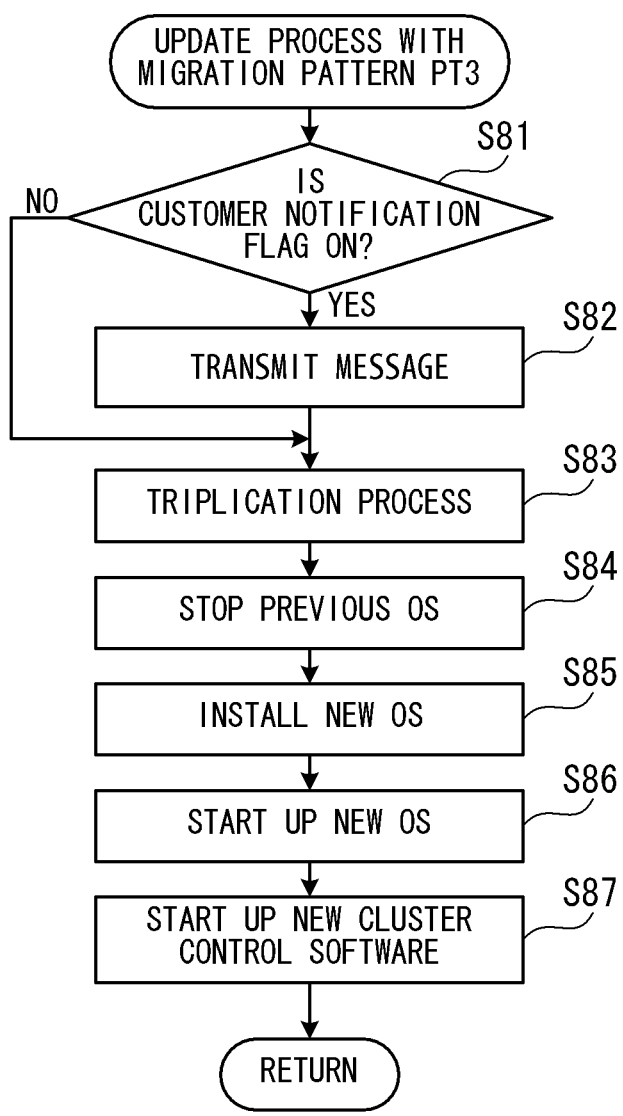
FIG. 23 is a flowchart showing a procedure of the update process with a migration pattern PT3.

FIG. 23 is a flowchart showing a procedure of the update process with the migration pattern "PT3". Hereinafter, the process shown in FIG. 23 will be described according to the step numbers.

[Step S81] With reference to the migration pattern table 827a, the update unit 828 judges whether or not the customer notification flag for the cluster group of the update target is ON. If the customer notification flag is ON, the process proceeds to step S82. If the customer notification flag is OFF, the process proceeds to step S83. A case where the customer notification flag is OFF while the migration pattern is "PT3" corresponds to a case where the administrator has judged that the notification of the message is unnecessary and has rewritten the customer notification flag in the migration pattern table 827a to OFF. If the migration pattern is "PT3", since the triplication process is performed, services for the user are not stopped. Thus, the administrator can also select not to transmit the message to the terminal devices 21 to 23.

[Step S82] If the customer notification flag is ON, the update unit 828 transmits the stop message to the terminal devices 21 to 23. Specifically, with reference to the migration pattern table 827a, the update unit 828 obtains the identification number of the message. Next, with reference to the message management table 824, the update unit 828 obtains the message corresponding to the identification number of the message. Then, the update unit 828 transmits the obtained message to the respective terminal devices 21 to 23 via the access nodes 600 and 700. In the example of FIG. 13, a message indicating that a processing capacity is reduced for a predetermined time is transmitted.

[Step S83] The update unit 828 specifies the disk node of the software update target, and instructs the control node 500 to perform the triplication process. The control node 500 which has received the triplication process instruction copies the data managed by the disk node of the update target to another disk node belonging to the same cluster group. When the copy is completed, the control node 500 assigns a slice in which the copied data has been stored, to the logical volume, and cancels the assignment of the slice managed by the disk node of the update target. Along with this change in the assignment, the control node 500 updates the slice management information within the slice management information group memory unit 520, and transmits the updated slice management information to the access nodes 600 and 700. In this way, after the data has gone through the triplicated state, the disk node of the update target is separated from the system (is removed from targets of the assignment to the segment). Thereby, the data which has been stored in the disk node of the update target becomes in the duplicated state on the system.

[Step S84] The update unit 828 instructs the disk node of the software update target to stop a previous OS. The disk node which has received the instruction stops the OS.

[Step S85] The update unit 828 installs the new OS in the disk node by a remote operation. If the OS cannot be installed by the remote operation, the administrator directly performs an operation input to the disk node to perform an OS installation task.

[Step S86] The update unit 828 instructs the disk node to start up the OS. Then, the disk node starts up the new OS. On this occasion, the storage device (RAID) of the updated disk node is initialized.

[Step S87] The update unit 828 starts up the cluster control software of the new version number in the disk node. Specifically, for the disk node, with reference to the post-migration environment table 826a, the update unit 828 obtains the software name and the version number of the cluster control software after the migration. Then, the update unit 828 specifies the software name and the version number after the migration, and transmits the cluster control software start-up request to the disk node. The disk node which has received the start-up request starts up the program of the specified version number of the specified cluster control software. Along with the start-up of the program, the write prohibition process is canceled. Subsequently, the update unit 828 instructs the control node 500 to relocate the data, and the update process with the migration pattern "PT3" is completed.

The data relocation is a process of changing the slice which is assigned to each segment, in the logical disks so that the data access may be efficient. In other words, if there is a bias among the disk nodes to which the slices assigned to the segments, in the logical disks belong, the access is concentrated on a specific disk node. Thus, delay in response becomes likely to occur in the data access. Immediately after the software update through triplication, the slice of the disk node of the update target has not been assigned to the segment. Thus, the data relocation is performed so that the number of the slices assigned to the logical disk in each of the disk nodes 110, 120, 130, . . . becomes equal among the disk nodes.

Specifically, in the control node 500 which has received the data relocation instruction, the logical volume management unit 510 judges a segment assignment relationship for the segments of the logical volumes. On this occasion, the slices of the respective disk nodes 110, 120, 130, . . . are equally selected as targets of the assignment to the logical volumes. Then, the logical volume management unit 510 instructs the respective disk nodes 110, 120, 130, . . . to perform the data relocation so that the judged assignment relationship may be realized. The disk nodes 110, 120, 130, . . . pass the data to one another, and store data depending on the assignment after the relocation, in the slices. Subsequently, the slice management information on the respective disk nodes 110, 120, 130, . . . , the control node 500, and the access nodes 600 and 700 is updated. The relocation as described above enables efficient data access even after the software update with the migration pattern "PT3".

It should be understood that the process shown in FIG. 23 is performed in order for the disk nodes belonging to the cluster group. Since the process is executed in order, the data copy process in the triplication can be prevented from occurring redundantly. Moreover, the OS in each of the multiple disk nodes within the cluster group can also be prevented from stopping around the same time.

As described above, since the migration patterns depending on the processing contents at the time of the software update have been defined, it is not necessary to perform the data triplication if the update can be performed in a short time. As a result, the software update can be completed in a short time.

Here, the prior recovery process will be described.

Figure 24:
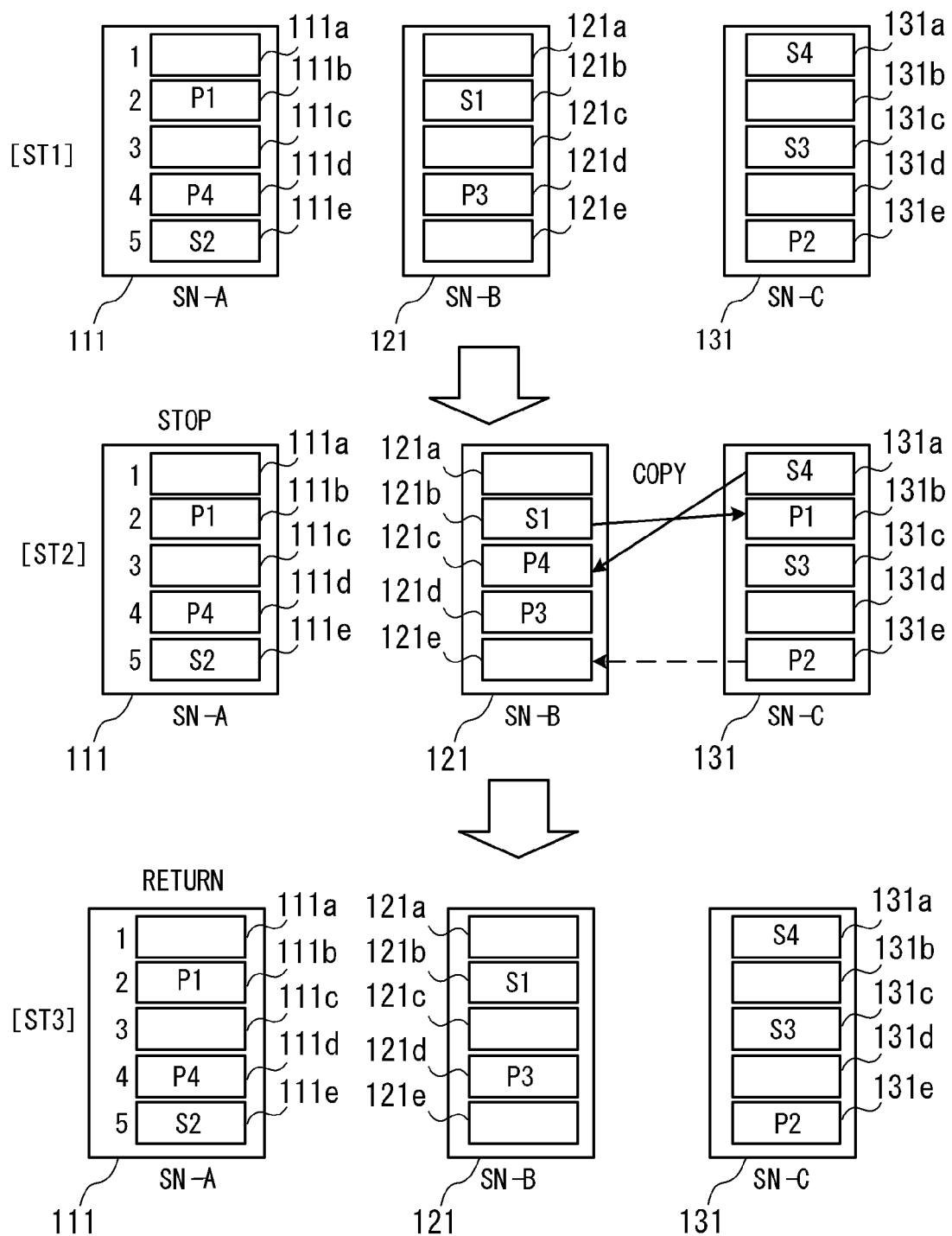
FIG. 24 is a diagram showing a summary of a prior recovery process.

FIG. 24 is a diagram showing a summary of the prior recovery process. The prior recovery process is a recovery process which is executed in a preventive manner based on the assumption that the restart of the new software may fail in the software update.

A first state [ST1] shows data allocation before the software update is started. Contents of this allocation are as shown in FIG. 4.

A second state [ST2] shows a state where the function of the disk node 110 has stopped for the software update. Since the function of the disk node 110 has stopped, a process of recovering the data which has been stored in the storage device 111 connected to the disk node 110 is started.

Specifically, the control node 500 identifies slice data existing within the disk node which has stopped, and searches slice data which is paired therewith and exists within another normal disk node. Then, the control node 500 instructs the disk node managing appropriate data to copy the data to another disk node (excluding the disk node which has stopped). In an example of FIG. 24, it is necessary to recover the primary slice of a first segment "P1", the secondary slice of a second segment "S2", and the primary slice of a fourth segment "P4". Consequently, the data in the fourth segment is copied from the slice 131a of the storage device 131 to the slice 121c of the storage device 121, and the data in the first segment is copied from the slice 121b of the storage device 121 to the slice 131b of the storage device 131. Then, it is assumed that the disk node 110 has returned before the data in the second segment is copied.

A third state [ST3] shows a state after the disk node 110 has returned. If the disk node 110 has normally returned, the data which has been stored in the storage device 111 included in the disk node 110 becomes valid. Storage areas for the data which has been copied by the prior recovery process are released, and the data which has been stored in the corresponding areas becomes invalid.

In this way, although the device temporarily stops and the recovery process occurs when the update is performed, the recovery process is completed when the update is completed and thereby the disk node 110 returns. If the disk node 110 has not been able to return, the recovery process is continued. In this case, a time until the recovery is reduced in comparison with a case where the recovery process is started after it is found that the disk node 110 cannot return.

Moreover, if the prior recovery process has been performed, a time in which the data redundancy is compromised can be reduced. In other words, in the data which has been completely copied during the software update, the duplication is maintained after the copy, and reliability of the data can be maintained.

It should be understood that, in the present embodiment, if the prior recovery process is executed, the write prohibition process for the data is performed. Thus, the prior recovery process can be performed without consideration of the data writing, which can simplify the process. In other words, in order to perform the prior recovery process in a state where the data writing has been permitted, additional processes as described below are required.

In each disk node, update statuses of the managed slices are managed. The update statuses are judged based on update counters set in each disk node. As the update counter, for example, a serial number can be used. If the serial number has been used as the update counter, each disk node adds 1 to the serial number each time the data in the slice is updated. Since the numbers of times of the updates of the data in the slices (the primary slice and the secondary slice) constituting the same segment are equal, serial numbers in the two slices constituting the segment are identical with each other during a normal operation.

However, when a process of updating the data which has been stored in a failing disk node is performed, only the data in the paired slice is updated, and the update counter is counted up. Subsequently, when the disk node which has stopped returns, the update counter in the slice managed by the disk node which has returned and the update counter in the slice which is paired with that slice and managed by another disk node have different values. Therefore, whether or not the data has been updated can be determined by comparing these update counters.

Consequently, when the disk node which has stopped returns, the update counter in the slice managed by that disk node and the update counter in the paired slice are compared, and thereby whether or not the update has been performed is determined. If data which has not been copied yet, has not been updated, the copy is stopped. If the data which has not been copied yet, has been updated, the updated data is copied and duplicated. If data which has been already copied, has not been updated, the data within the storage device 111 included in the disk node 110 is set to be valid. Thus, the area for the slice 121c in the storage device 121 is released (the copied data becomes invalid). If the data which has been already copied, has been updated, the data copied in the prior recovery process is set to be valid. Thus, the area for the slice 111*b* in the storage device 111 is released (the stored data becomes invalid).

In this way, in order to perform the prior recovery process without prohibiting the data writing, data update management (management of the update counters, and judgment on whether or not the data has been updated after the disk node has returned) is required. If the data writing has been prohibited, these processes are unnecessary, which improves a processing efficiency of the prior recovery process.

It should be noted that, in the above described embodiment, although the management node 800 has the update management unit 820, the function of the update management unit 820 can also be provided within the control node 500.

It should be noted that the above described processing functions can be realized by a computer. In that case, there is provided a program in which processing contents of functions to be included in the management node and the control node have been described. The program is executed by the computer, and thereby the above described processing functions are realized on the computer. The program in which the processing contents have been described can be recorded in a computer-readable recording medium. As the computer-readable recording medium, there are a magnetic recording device, an optical disk, a magneto-optical recording medium, a semiconductor memory and the like. The magnetic recording device includes a hard disk device (HDD), a flexible disk (FD), a magnetic tape and the like. The optical disk includes a DVD (Digital Versatile Disc), a DVD-RAM, a CD-ROM (Compact Disc Read Only Memory), a CD-R (Recordable)/RW (ReWritable) and the like. The magneto-optical recording medium includes an MO (Magneto-Optical disc) and the like.

If the program is distributed, for example, a portable recording medium such as the DVD or the CD-ROM in which the program has been recorded is marketed. Moreover, it is also possible to previously store the program in a memory device of a server computer, and transfer the program from the server computer to another computer via a network.

For example, the computer which executes the program stores the program recorded in the portable recording medium or the program transferred from the server computer, in its own memory device. Then, the computer reads the program from its own memory device, and executes a process according to the program. It should be understood that the computer can also read the program directly from the portable recording medium and execute the process according to the program. Moreover, the computer can also sequentially execute the process according to the program which has been received, each time the program is transferred from the server computer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable storage medium having stored therein a software update management program for causing a computer to execute a software update process for a disk node in a distributed storage system which performs data management with redundancy with multiple disk nodes, said software update management program causing said computer to function as:

migration content judgment unit which reads a pre-migration environment table in which a software name and a version number of software before being updated in a target disk node which is an update target have been set for each function of said target disk node, and a post-migration environment table in which the software name and the version number of the software after being updated in said target disk node have been set for each function of said target disk node, from a memory device, and judges a migration content indicating a transition of the software name and the version number between before and after the update, for each function of said target disk node;

migration pattern determination unit which reads a migration pattern determination table in which a correspondence relationship between multiple migration patterns and migration contents to be applied with the migration patterns has been set, from the memory device, and determines a migration pattern to be applied to said target disk node based on the migration content judged by said migration content judgment means and said migration pattern determination table, said multiple migration patterns being classified into a first class migration pattern in which an update of data managed by said target disk node is prohibited and thereby a software update is performed while data redundancy is maintained, and a second class migration pattern in which the data managed by said target disk node is copied to another one of said disk nodes and thereby the software update is performed while the data redundancy is maintained; and update unit which reads said post-migration environment table from the memory device, issues an instruction to said target disk node according to the migration pattern determined by said migration pattern determination means, and updates software which executes each function of said target disk node, to the software name and the version number which have been set in said post-migration environment table.

2. The non-transitory computer readable storage medium having stored therein the software update management program according to claim 1, wherein:

in said pre-migration environment table, a software name and a version number of software related to a cluster control function and an operating system before the software update have been set, and in said post-migration environment table, the software name and the version number of the software related to the cluster control function and the operating system after the software update have been set.

3. The non-transitory computer readable storage medium having stored therein the software update management program according to claim 1, wherein:

in said migration pattern determination table, application of a migration pattern belonging to said second class migration pattern has been set in a case of a migration content in which the software of the operating system is changed.

4. The non-transitory computer readable storage medium having stored therein the software update management program according to claim 1, wherein:

in said migration pattern determination table, application of a migration pattern belonging to said first class migration pattern has been set in a case of a migration content in which the software of the operating system remains the same and the version number of the operating system is updated.

5. The non-transitory computer readable storage medium having stored therein the software update management program according to claim 1, wherein:
multiple migration patterns belonging to said first class migration pattern have been set in said migration pattern determination table.

6. The non-transitory computer readable storage medium having stored therein the software update management program according to claim 5, wherein:
in said migration pattern determination table, as the migration patterns belonging to said first class migration pattern, a migration pattern involving reboot of the operating system and a migration pattern not involving the reboot of the operating system have been set.

7. The non-transitory computer readable storage medium having stored therein the software update management program according to claim 1, wherein:
said migration pattern determination table includes a migration pattern in which a process of recovering the data managed by said target disk node is started in parallel with the software update process, and in which the recovery process for other data which has not been updated during the software update is stopped if the updated software has been able to be normally started up, as a migration pattern belonging to said first class migration pattern.

8. The non-transitory computer readable storage medium having stored therein the software update management program according to claim 1, wherein:
said update unit obtains a required time table in which a required time for each migration pattern has been set, from the memory device, and if the required time for the migration pattern to be applied to said target disk node is more than a predetermined time, said update unit transmits a message for calling attention associated with the update process, to a terminal device which outputs a request for accessing said target disk node.

9. The medium according to claim 1, wherein
the first class migration pattern and the second class migration pattern are selectively set based on time for performing the software update.

10. A software update management apparatus which executes a software update process for a disk node in a distributed storage system which performs data management with redundancy with multiple disk nodes, comprising:
a processor programmed to include,
a migration content judgment unit which reads a pre-migration environment table in which a software name and a version number of software before being updated in a target disk node which is an update target have been set for each function of said target disk node, and a post-migration environment table in which the software name and the version number of the software after being updated in said target disk node have been set for each function of said target disk node, from a memory device, and judges a migration content indicating a transition of the software name and the version number between before and after the update, for each function of said target disk node;
a migration pattern determination unit that reads a migration pattern determination table in which a correspondence relationship between multiple migration patterns and migration contents to be applied with the migration patterns has been set, from the memory device, and determines a migration pattern to be applied to said target disk node based on the migration content judged by said migration content judgment unit and said migration pattern determination table, said multiple migration patterns being classified into a first class migration pattern in which an update of data managed by said target disk node is prohibited and thereby a software update is performed while data redundancy is maintained, and a second class migration pattern in which the data managed by said target disk node is copied to another one of said disk nodes and thereby the software update is performed while the data redundancy is maintained; and
an update unit which reads said post-migration environment table from the memory device, issues an instruction to said target disk node according to the migration pattern determined by said migration pattern determination unit, and updates software which executes each function of said target disk node, to the software name and the version number which have been set in said post-migration environment table.

11. The apparatus according to claim 10, wherein
the first class migration pattern and the second class migration pattern are selectively set based on time for performing the software update.

12. A software update management method in which a computer executes a software update process for a disk node in a distributed storage system which performs data management with redundancy with multiple disk nodes, wherein said computer performs:
reading a pre-migration environment table in which a software name and a version number of software before being updated in a target disk node which is an update target have been set for each function of said target disk node, and a post-migration environment table in which the software name and the version number of the software after being updated in said target disk node have been set for each function of said target disk node, from a memory device, and judging a migration content indicating a transition of the software name and the version number between before and after the update, for each function of said target disk node;
reading a migration pattern determination table in which a correspondence relationship between multiple migration patterns and migration contents to be applied with the migration patterns has been set, from the memory device, and determining a migration pattern to be applied to said target disk node based on the migration content judged by said migration content judgment and said migration pattern determination table, said multiple migration patterns being classified into a first class migration pattern in which an update of data managed by said target disk node is prohibited and thereby a software update is performed while data redundancy is maintained, and a second class migration pattern in which the data managed by said target disk node is copied to another one of said disk nodes and thereby the software update is performed while the data redundancy is maintained; and
reading said post-migration environment table from the memory device, issuing an instruction to said target disk node according to the migration pattern determined by said migration pattern determination, and updating software which executes each function of said target disk node, to the software name and the version number which have been set in said post-migration environment table.

13. The method according to claim 12, wherein
the first class migration pattern and the second class migration pattern are selectively set based on time for performing the software update.

\* \* \* \* \*